United States Patent
Zhao et al.

(10) Patent No.: US 8,781,738 B2
(45) Date of Patent: *Jul. 15, 2014

(54) AUTOMATED LOCATION-INTELLIGENT TRAFFIC NOTIFICATION SERVICE SYSTEMS AND METHODS

(71) Applicant: AT&T Intellectual Property I, L.P., Atlanta, GA (US)

(72) Inventors: Wei Zhao, Alpharetta, GA (US); Lara F. Morgan, Norcross, GA (US); Xiaofeng Gao, Alpharetta, GA (US); Michael A. Oblon, Rockville, MD (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/033,551

(22) Filed: Sep. 23, 2013

(65) Prior Publication Data

US 2014/0025281 A1 Jan. 23, 2014

Related U.S. Application Data

(63) Continuation of application No. 13/603,769, filed on Sep. 5, 2012, now Pat. No. 8,543,334, which is a continuation of application No. 13/048,508, filed on Mar. 15, 2011, now Pat. No. 8,296,066, which is a continuation of application No. 12/570,817, filed on Sep. 30, 2009, now Pat. No. 7,912,642, which is a continuation of application No. 12/239,259, filed on Sep. 26, 2008, now Pat. No. 7,617,043, which is a continuation of application No. 11/834,428, filed on Aug. 7, 2007, now Pat. No. 7,430,472, which is a continuation of application No. 11/209,115, filed on Aug. 22, 2005, now Pat. No. 7,269,505, which is a continuation of application No. 10/677,417, filed on Oct. 2, 2003, now Pat. No. 6,973,384, which is a continuation-in-part of application No. 10/004,500, filed on Dec. 6, 2001, now Pat. No. 6,741,926.

(51) Int. Cl.
G01C 21/26 (2006.01)
G01C 21/34 (2006.01)
G08G 1/0967 (2006.01)

(52) U.S. Cl.
USPC ........... 701/516; 701/526; 701/414; 701/420; 701/423

(58) Field of Classification Search
None
See application file for complete search history.

(56) References Cited

U.S. PATENT DOCUMENTS

| 4,812,843 A | 3/1989 | Champion et al. |
| 5,752,186 A | 5/1998 | Malackowski et al. |
| 5,774,827 A | 6/1998 | Smith et al. |
| 5,850,190 A | 12/1998 | Wicks et al. |
| 5,959,577 A | 9/1999 | Fan et al. |

(Continued)

FOREIGN PATENT DOCUMENTS

WO 0201532 1/2002

OTHER PUBLICATIONS

"Welcome to Traffic," [http://www.traffic.com] 12 Sheets printed Apr. 14, 2001.

(Continued)

*Primary Examiner* — Michael J Zanelli

(74) *Attorney, Agent, or Firm* — Hartman & Citrin LLC

(57) ABSTRACT

Traffic notification systems include a location determination system that can determine a geographic location of a subscriber, and an automated traffic notification system that can automatically transmit a traffic notification message that is based on the geographic location of the subscriber to a wireless terminal associated with the subscriber.

20 Claims, 28 Drawing Sheets

(56) References Cited

U.S. PATENT DOCUMENTS

| | | |
|---|---|---|
| 6,029,069 A | 2/2000 | Takaki |
| 6,055,566 A | 4/2000 | Kikinis |
| 6,088,594 A | 7/2000 | Kingdon et al. |
| 6,199,045 B1 | 3/2001 | Giniger et al. |
| 6,243,039 B1 | 6/2001 | Elliot |
| 6,253,146 B1 | 6/2001 | Hanson et al. |
| 6,266,615 B1 | 7/2001 | Jin |
| 6,317,684 B1 | 11/2001 | Roeseler et al. |
| 6,331,825 B1 | 12/2001 | Ladner et al. |
| 6,404,880 B1 | 6/2002 | Stevens |
| 6,411,220 B1 | 6/2002 | Davis et al. |
| 6,456,234 B1 | 9/2002 | Johnson |
| 6,466,862 B1 | 10/2002 | DeKock et al. |
| 6,490,521 B2 | 12/2002 | Wiener |
| 6,496,776 B1 | 12/2002 | Blumberg et al. |
| 6,539,302 B1 | 3/2003 | Bender et al. |
| 6,584,401 B2 | 6/2003 | Kirshenbaum et al. |
| 6,590,507 B2 | 7/2003 | Burns |
| 6,591,188 B1 | 7/2003 | Ohler |
| 6,611,687 B1 | 8/2003 | Clark et al. |
| 6,711,408 B1 | 3/2004 | Raith |
| 6,813,556 B2 | 11/2004 | Watanabe |
| 2001/0001848 A1 | 5/2001 | Oshizawa et al. |
| 2002/0152020 A1 | 10/2002 | Seibel |
| 2003/0060212 A1 | 3/2003 | Thomas |
| 2006/0129313 A1 | 6/2006 | Becker et al. |

OTHER PUBLICATIONS

"Traffic Alerts, SmartRoute Systems[1] SmarTraveler," [http://www,washingtpost.com] 5Sheets printed Oct. 24, 2003 (date service first offered unknown but for examination purposes is stated to be before the earliest claimed priority date).

U.S. Office Action dated Jul. 1, 2011 in U.S. Appl. No. 13/048,508.
U.S. Office Action dated Oct. 28, 2011 in U.S. Appl. No. 13/048,508.
U.S. Office Action dated Mar. 5, 2012 in U.S. Appl. No. 13/048,508.
U.S. Notice of Allowance dated Jun. 8, 2012 in U.S. Appl. No. 13/048,508.
U.S. Office Action dated Jun. 15, 2010 in U.S. Appl. No. 12/570,817.
U.S. Notice of Allowance dated Nov. 12, 2010 in U.S. Appl. No. 12/570,817.
U.S. Office Action dated Mar. 2, 2009 in U.S. Appl. No. 12/239,259.
U.S. Notice of Allowance dated Jul. 17, 2009 in U.S. Appl. No. 12/239,259.
U.S. Office Action dated Oct. 25, 2007 in U.S. Appl. No. 11/834,728.
U.S. Office Action dated May 8, 2008 in U.S. Appl. No. 11/834,728.
U.S. Notice of Allowance dated Aug. 15, 2008 in U.S. Appl. No. 11/834,728.
U.S. Office Action dated Mar. 14, 2006 in U.S. Appl. No. 11/209,115.
U.S. Office Action dated Aug. 25, 2006 in U.S. Appl. No. 11/209,115.
U.S. Office Action dated Nov. 8, 2006 in U.S. Appl. No. 11/209,115.
U.S. Office Action dated Mar. 9, 2007 in U.S. Appl. No. 11/209,115.
U.S. Notice of Allowance dated May 16, 2007 in U.S. Appl. No. 11/209,115.
U.S. Office Action dated Feb. 8, 2005 in U.S. Appl. No. 10/677,417.
U.S. Office Action dated Jun. 7, 2005 in U.S. Appl. No. 10/677,417.
U.S. Notice of Allowance dated Aug. 5, 2005 in U.S. Appl. No. 10/677,417.
U.S. Office Action dated Oct. 10, 2012 in U.S. Appl. No. 13/603,769.
U.S. Office Action dated Jan. 30, 2013 in U.S. Appl. No. 13/603,769.
U.S. Notice of Allowance dated May 14, 2013 in U.S. Appl. No. 13/603,769.

FIG. 4

| ROUTE | STREET | STRETCH OF ROAD | DISTANCE |
|---|---|---|---|
| | (1) | Rt 23 N, b/t 1$^{st}$ & A Sts., | 3 mi |
| | (2) | A St. W, b/t Rt 23 N & G St., | 6 mi |
| (A) | (3) | G St. S, b/t A St. & J St., | 1 mi |
| | (4) | J St. SW, b/t G St. & 2$^{nd}$ St. | 2 mi |
| | (5) | 2$^{nd}$ St. NW, b/t J St. & Hwy 350 | 0.5 mi |
| | (6) | Hwy 350 N, b/t J St. & Hwy 350 | 5 mi |
| | (1) | Rt 23 N, b/t 1$^{st}$ & 2nd Sts. | 0.5 mi |
| (B) | (2) | 2$^{nd}$ St. W, b/t Rt 23N & Hwy 350 | 6 mi |
| | (3) | Hwy 350 N, b/t Rt 23N & Hwy 350 | 5 mi |
| | (1) | Rt 23 S, b/t 2$^{nd}$ & 1$^{st}$ Sts. | .5 mi |
| | (2) | 1$^{st}$ St. W, b/t Rt 23 & I-87 | 2 mi |
| (C) | (3) | I-87 SW, b/t 1$^{st}$ St. & I-95 | 2 mi |
| | (4) | I-95 NW, b/t I-87 & G St. | 6 mi |
| | (4) | G St. N, b/t I-95 & 22$^{nd}$ St. | 1 mi |
| | (5) | 22$^{nd}$ St. W, b/t G St. & Hwy 350 | 3 mi |
| | (6) | Hwy 350 N, b/t G St. & Hwy 350 | 10 mi |

FIG. 5

| | List of Streets in Route | Mi. | Average MPH | # of Traffic Lights | Traffic Advisory/Category | Estimated MPH | Traffic light timing | Time |
|---|---|---|---|---|---|---|---|---|
| (A) (1) | Rt 23 N, b/t 1st & A Sts., | 3 mi | 45 mph | 1 | None | 45 mph | +1 min | 5 min |
| (2) | A St. W, b/t Rt 23 N & G St., | 6 mi | 45 mph | 0 | Congestion, Category 3 | 25 mph | 0 min | 14 min |
| (3) | G St. S, b/t A St. & J St., | 1 mi | 15 mph | 1 | None | 15 mph | +2 min | 6 min |
| (4) | J St. SW, b/t G St. & 2nd St. | 2 mi | 30 mph | 0 | Congestion, Category 4 | 25 mph | 0 | 4.5 min |
| (5) | 2nd St. NW, b/t J St. & Hwy 350 | 0.5 mi | 15 mph | 1 | Congestion, Category 2 | 8 mph | +1 min | 5 min |
| (6) | Hwy 350 N, b/t J St. & Hwy 350 | 5 mi | 55 mph | 0 | None | 55 mph | 0 | 5.5 min |
| | TOTAL TIME FOR ROUTE "A" = 40 MINUTES | | | | | | | |
| (B) (1) | Rt 23 N, b/t 1st & 2nd Sts. | 0.5 mi | 45 mph | 1 | None | 45 mph | +1 min | 1.5 min |
| (2) | 2nd St. W, b/t Rt 23N & Hwy 350 | 6 mi | 15 mph | 8 | Congestion, Category 4 | 12 mph | +8 min | 38 min |
| (3) | Hwy 350 N, b/t Rt 23N & Hwy 350 | 5 mi | 55 mph | 0 | None | 55 mph | 0 | 5.5 min |
| | TOTAL TIME FOR ROUTE "B" = 45 MINUTES | | | | | | | |
| (C) (1) | Rt 23 S, b/t 2nd & 1st Sts. | .5 mi | 45 mph | 1 | None | 45 mph | +1 min | 2.5 min |
| (2) | 1st St. W, b/t Rt 23 & I-87 | 2 mi | 35 mph | 0 | None | 35 mph | 0 | 3.5 min |
| (3) | I-187 SW, b/t 1st St. & I-95 | 2 mi | 65 mph | 0 | None | 65 mph | 0 | 2.0 min |
| (4) | I-95 NW, b/t I-87 & G St. | 6 mi | 65 mph | 0 | Accident, Category 1 | 8 mph | 0 | 45 min |
| (5) | G St. N, b/t I-95 & 22nd St. | 1 mi | 25 mph | 1 | None | 25 mph | 1 | 3.4 min |
| (6) | 22nd St. W, b/t G St. & Hwy 350 | 3 mi | 50 mph | 0 | None | 50 mph | 0 | 3.6 min |
| (7) | Hwy 350 N, b/t G St. & Hwy 350 | 10 mi | 55 mph | 0 | None | 55 mph | 0 | 5.5 min |
| | TOTAL TIME FOR ROUTE "C" = 65 MINUTES | | | | | | | |

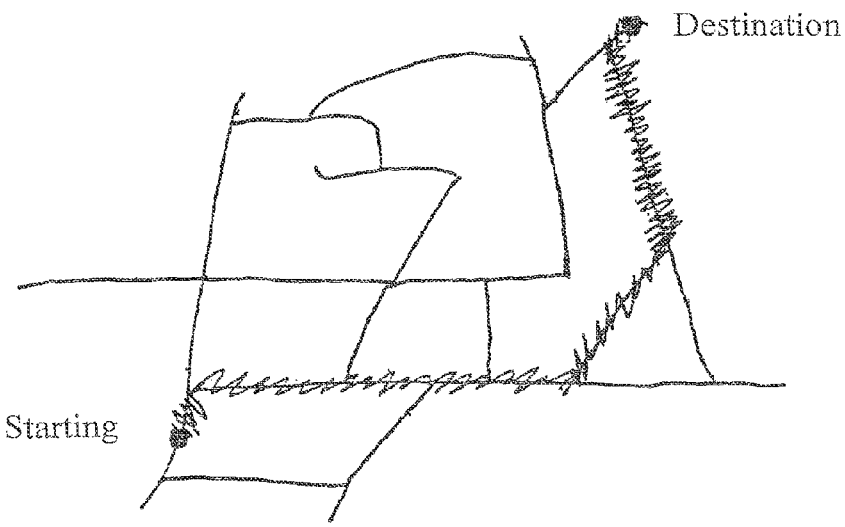

FIG. 13

SUBSCRIBER DATABASE

CLIENT: JOHN DOE
DIRECTORY NUMBER: (404) 555-1325
INFORMATION REPORTING FORMAT: SMS

| | |
|---|---|
| 1. | STREET: HALLOWELL DRIVE, NORTH<br>LOCATION: BETWEEN 3RD & 5TH STS.<br>TIME: 12:00 PM<br>DAYS OF WEEK: SATURDAY |
| 2. | ROUTE: ALONG CHERRY VALLEY<br>STREETS: (1) RT 23 N, B/T 1ST & A STS., 3 MI<br>(2) A ST. W, B/T RT 23 N & G ST., 6 MI<br>(3) G ST. S, B/T A ST. & J STS., 1 MI<br>(4) 2ND ST. NW, B/T J ST. & S STS., 5 MI<br>TIME: 8:00 AM<br>DAYS OF WEEK: WEEKDAYS<br>COMPARE WITH: "ALONG HIGHWAY" |
| 3. | ROUTE: ALONG HIGHWAY<br>STREETS: (1) I-395, B/T EXIT 35 & EXIT 47, 10 MI<br>(2) BACKLICK ROAD, B/T I-395 & _____ RD, 3 MI<br>TIME: 8:00 AM<br>DAYS OF WEEK: WEEKDAYS<br>COMPARE WITH: "ALONG CHERRY VALLEY" |

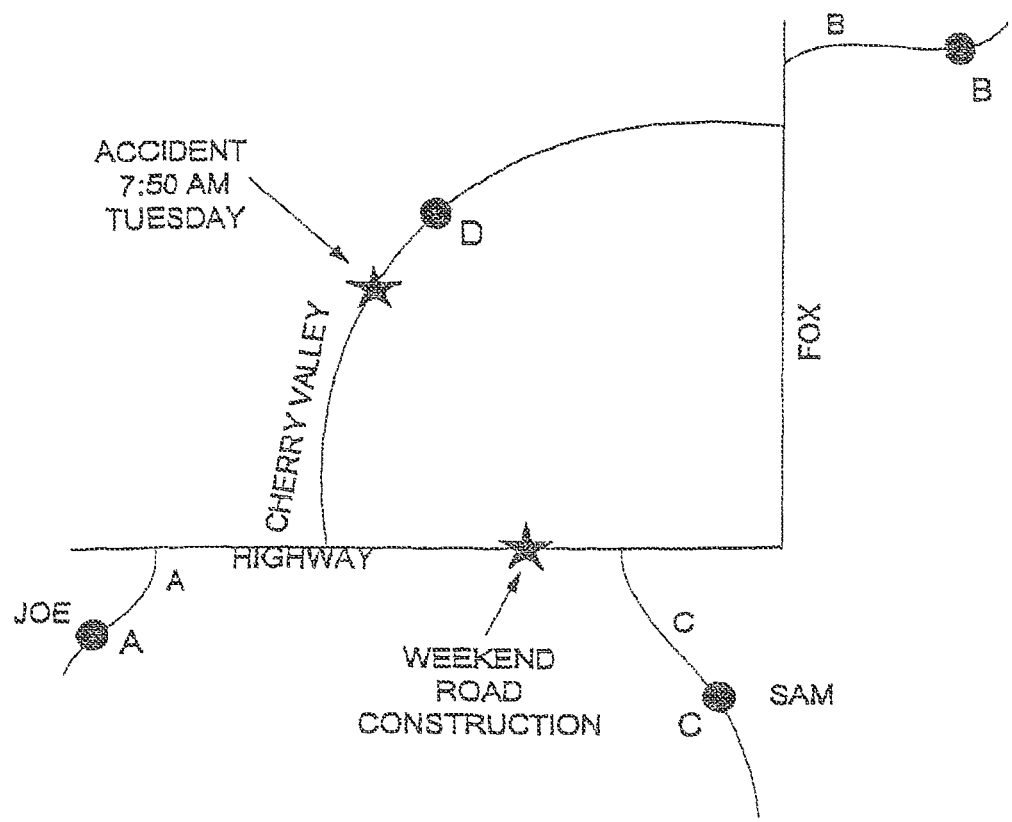

FIGURE 15

| | TIME/DAY | SUBSCRIBER NO./NAME | ROUTE/ STREET | INFO |
|---|---|---|---|---|
| 1. | 8:00 AM, MONDAY | 555-1212/JOE | ROUTE | A HIGHWAY FOX B = "ALONG HIGHWAY" A CHERRY VALLEY FOX B = "ALONG CHERRY VALLEY" |
| 2. | 11:00 AM, MONDAY | 650-1324/SARAH | STREET | FOX STREET, B/T HIGHWAY & B |
| 3. | 3:30 PM, MONDAY | 924-3526/TONY | ROUTE | C FOX B = "BY FOX" C HIGHWAY D FOX B = "DETOUR" |
| 4. | 5:00 AM, TUESDAY | 999-1234/SAM | STREET | HIGHWAY, B/T A & C |
| 5. | 8:00 AM, TUESDAY | 555-1212/JOE | ROUTE | A HIGHWAY FOX B = "ALONG HIGHWAY" A CHERRY VALLEY FOX B = "ALONG CHERRY VALLEY" |
| | . | . | . | |
| | . | . | . | |
| 6. | 12:00 PM, SATURDAY | 999-1234/SAM | STREET | HIGHWAY, B/T A & C |
| | . | . | . | |
| | . | . | . | |

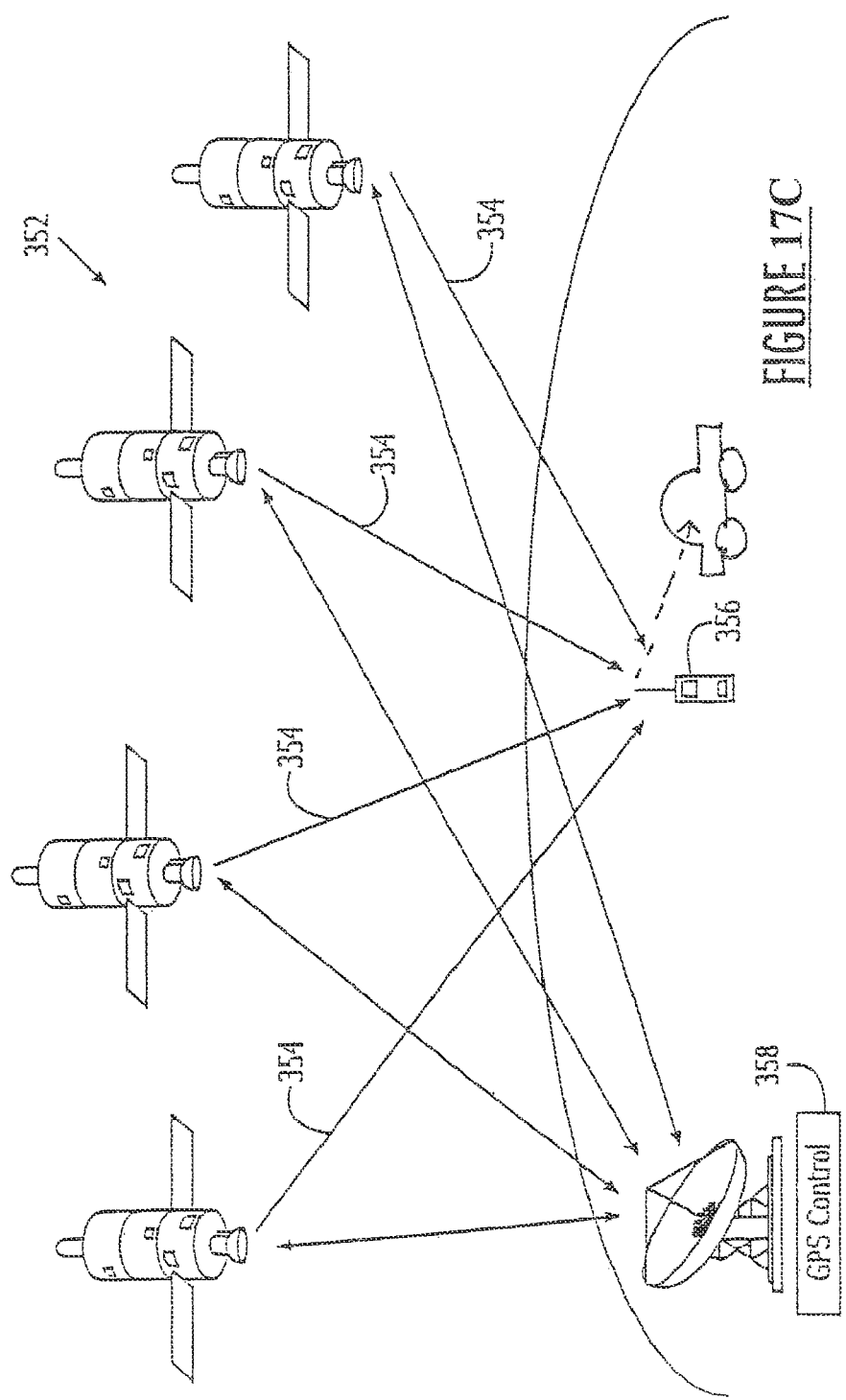

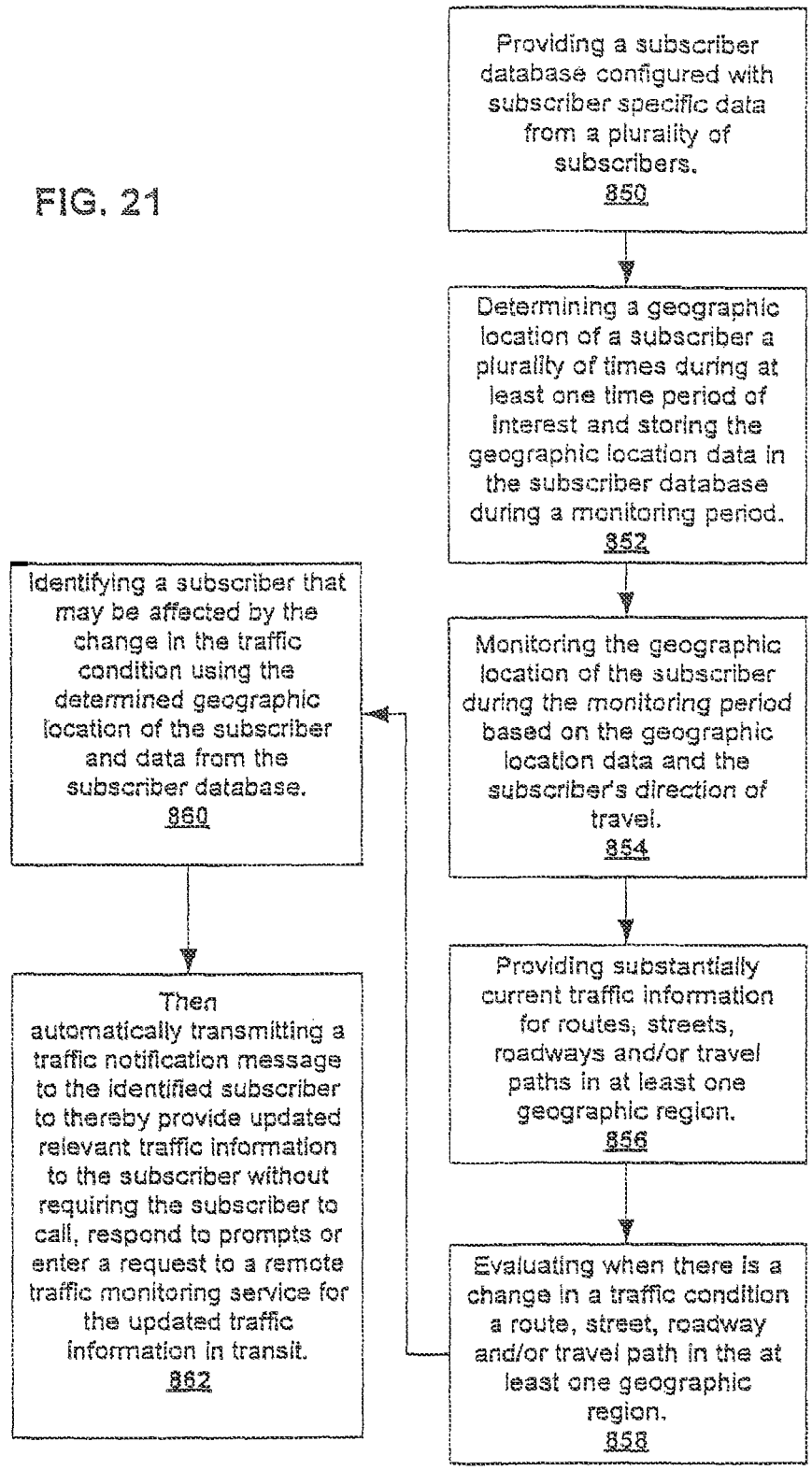

AUTOMATED LOCATION-INTELLIGENT TRAFFIC NOTIFICATION SERVICE SYSTEMS AND METHODS

CROSS-REFERENCE TO RELATED APPLICATIONS

This patent application is a continuation of U.S. patent application Ser. No. 13/603,769, filed Sep. 5, 2012, now U.S. Pat. No. 8,543,334, which is hereby incorporated by reference in its entirety; and which is a continuation of U.S. patent application Ser. No. 13/048,508, filed Mar. 15, 2011, now U.S. Pat. No. 8,296,066, which is hereby incorporated by reference in its entirety; and which is a continuation of U.S. patent application Ser. No. 12/570,817, filed Sep. 30, 2009, now U.S. Pat. No. 7,912,642, which is hereby incorporated by reference in its entirety; and which is a continuation of U.S. patent application Ser. No. 12/239,259, filed Sep. 26, 2008, now U.S. Pat. No. 7,617,043, which is hereby incorporated by reference in its entirety; and which is a continuation of U.S. patent application Ser. No. 11/834,728, filed Aug. 7, 2007, now U.S. Pat. No. 7,430,472, which is hereby incorporated by reference in its entirety; and which is a continuation of U.S. patent application Ser. No. 11/209,115, filed Aug. 22, 2005, now U.S. Pat. No. 7,269,505, which is hereby incorporated by reference in its entirety; and which is a continuation of U.S. patent application Ser. No. 10/677,417, filed Oct. 2, 2003, now U.S. Pat. No. 6,973,384, which is hereby incorporated by reference in its entirety; and which is a continuation-in-part of U.S. patent application Ser. No. 10/004,500, filed on Dec. 6, 2001, now U.S. Pat. No. 6,741,926, which is hereby incorporated by reference in its entirety.

FIELD OF THE INVENTION

The present invention relates to automotive traffic tracking systems, and more particularly, to a system for providing automotive traffic reports.

BACKGROUND INFORMATION

Over the past decade, automobile traffic has become an increasingly severe problem in many cities, sometimes affecting employees' productivity and quality of life. The amount of traffic congestion that occurs on any particular road at any given time may vary dramatically on each day, due to unpredictable variables including traffic accidents or road construction. If a commuter is unaware of the traffic conditions until he has become delayed in traffic, it is then too late to plan a viable alternative route. Despite attempts to avoid traffic by altering work schedules and experimenting with different routes, commuters continue to experience intolerable traffic, often on a regular basis.

Although there are several resources that are presently available to provide drivers with traffic information, they may not effectively allow drivers to easily obtain the information in time to avoid unpredictable traffic congestion while en route. For example, traffic reports that are broadcast over local radio stations typically provide driving conditions at periodic intervals and/or only for certain major highways. As another example, computerized, overhead traffic message displays that are located on some major roads or highways may not be very useful because drivers may not be given sufficient advanced notice to divert to alternative routes. While radio traffic reports and programmable signs can provide useful information, these resources cannot be customized to provide information on demand for individual driver's commutes, and therefore may have only a limited effect.

Recently, Internet web sites have been created for providing traffic information concerning specific roadways in certain metropolitan areas. The traffic information that is provided on such web sites is retrieved from databases containing traffic information that is periodically updated at regular intervals. Traffic.com, Inc. (available at traffic.com) operates a web site for providing traffic information for several major routes in certain metropolitan areas. The web site provides color-coded maps that illustrate the traffic conditions along several major roadways in certain metropolitan areas. Using a "keyroute summary," the web site also indicates, for several major routes, the average speed of traffic and whether there are any traffic advisories on the routes. As another example, a web site operated by The Washington Post (available at washingtonpost.com), allows a user to select or "click on" one of several roadways on a map of the Washington, D.C. metropolitan area and receive a short written report concerning traffic conditions for the selected roadway.

While web sites may provide traffic conditions, many drivers either do not have access to the Internet or otherwise do not wish to access the Internet from their home or office before beginning a commute. In either case, since traffic information changes constantly, the information that one obtains from a web site may no longer be accurate during the time that the user is driving. Accordingly, there is a need for systems that allow drivers to access real-time traffic information while commuting.

SUMMARY OF THE INVENTION

The present invention relates to methods and systems for providing traffic conditions to users/drivers that are subscribers of a traffic advisory service. As used herein the term "driver" is used to describe a user of a traffic notification system and includes subscribers or designees desiring traffic information typically located in a vehicle whether a "driver" or a "passenger." Similarly, the term "he" may be used with respect to certain descriptions to identify a user and is not meant to be gender specific.

Certain embodiments are directed toward a traffic notification system that includes: (a) a location determination system that is configured to determine a geographic location of a subscriber; and (b) an automated traffic notification system that is configured to automatically transmit a traffic notification message that is based on the geographic location of the subscriber to a wireless terminal that is associated with the subscriber.

The location determination system may be configured to automatically obtain a plurality of location readings while the subscriber is in transit to automatically monitor the location of the subscriber over a desired monitoring period.

In certain embodiments, the driver pre-configures a traffic predicting system by providing information identifying the driver's preferred routes for reaching a destination, and the typical range of times when the driver is commuting. The information stored in the database is associated with the driver's wireless telephone number. This embodiment can determine which route the driver is on and use a Short Messaging Service (SMS) to provide short messages via the driver's associated wireless telephone during the range of times when the driver is commuting or otherwise en route, to advise the driver which of the preferred routes to choose, alert of adverse traffic conditions, and/or advise whether to divert to a different travel route.

Certain embodiments of the present invention are directed to automated location-intelligent traffic notification systems. The systems include: (a) a subscriber database configured with subscriber specific data from a plurality of subscribers; (b) a traffic notification server in communication with the subscriber database; (c) a location determination system in communication with the traffic notification server, the location determination system configured to determine a geographic location of a subscriber during at least one time period of interest; and (d) a traffic monitoring system for providing traffic information for routes, streets, roadways and/or travel paths in at least one geographic region. During operation, the traffic notification server receives traffic condition data for a route, street, roadway and/or travel path in the at least one geographic region from the traffic monitoring system, identifies a subscriber that may be affected by the traffic condition using the determined geographic location of the subscriber and data from the subscriber database, and then automatically transmits a traffic notification message to the identified subscriber.

Embodiments of the present invention provide a method for providing traffic congestion information from a traffic database to a subscriber over a wireless network at a predetermined time. After determining that a subscriber requested traffic information at a present time, an indication of the traffic information requested by the subscriber is retrieved from a subscriber database. The requested traffic information is then retrieved from a traffic database. A short text message is then transmitted to the subscriber's wireless telephone providing requested traffic information.

Other embodiments for automated location-intelligent traffic notification systems include: (a) a subscriber database configured with subscriber specific data from a plurality of subscribers; (b) a traffic notification server in communication with the subscriber database; (c) means for determining a geographic location of the subscribers in communication with the traffic notification server, during at least one time period of interest; (d) means for monitoring traffic for obtaining traffic condition information for routes, streets, roadways and/or travel paths in at least one geographic region; and (e) means for transmitting traffic notification messages to subscribers. During operation, the traffic notification server receives the obtained traffic condition information, identifies a subscriber that may be affected by the traffic condition using the determined geographic location of the subscriber, and then automatically transmits a traffic notification to the identified subscriber.

Still other embodiments are directed to methods for providing traffic information to a subscriber over a wireless network. The methods can include: (a) providing a subscriber database of information corresponding to a plurality of subscribers; (b) monitoring geographic locations of a respective subscriber while the subscriber is in transit; (c) identifying relevant traffic conditions by correlating traffic conditions in a particular location to a respective subscriber's monitored geographic location; and (d) automatically relaying a wireless traffic notification message to the subscriber if the subscriber is identified as affected by a traffic condition based on the monitoring and identifying steps.

Other methods include: (a) providing a subscriber database of information corresponding to a plurality of subscribers; (b) determining when an adverse traffic condition exists in a subscriber's travel route; (c) assessing the current geographic location of the subscriber and the subscriber's destination when the adverse condition is determined to evaluate whether the adverse traffic condition is likely to affect the subscriber; and (d) automatically relaying a wireless traffic notification message to the subscriber about the adverse traffic condition if the subscriber is identified as likely to be affected by the adverse traffic condition based on the assessing step.

Other embodiments provide methods for providing traffic information from a traffic database to a subscriber over a wireless network during a desired monitoring interval or period. The methods include: (a) evaluating whether a subscriber requests to receive traffic information at a present time from a subscriber database; (b) dynamically determining a geographic location of the subscriber using a terrestrial and/or celestial based geographic location determination system; (c) retrieving traffic information for a particular geographic area and/or travel zone corresponding to a travel path of the subscriber and the determined geographic location of the subscriber; and (d) automatically transmitting a short text message to a subscriber's wireless communication device. The relevant traffic information customized to the subscriber's travel path is reported to the subscriber in the short text message while the subscriber is in transit.

Still other embodiments are directed to methods for providing automated location-intelligent traffic notifications. The methods include: (a) providing a subscriber database configured with subscriber specific data from a plurality of subscribers; (b) determining a geographic location of a subscriber a plurality of times during at least one time period of interest and storing the geographic location data in the subscriber database during a monitoring period; (c) monitoring the geographic location of the subscriber during the monitoring period based on the geographic location data and the subscriber's direction of travel; (d) providing substantially current traffic information for routes, streets, roadways and/or travel paths in at least one geographic region; (e) evaluating when there is a change in a traffic condition a route, street, roadway and/or travel path in the at least one geographic region; (f) identifying a subscriber that may be affected by the change in the traffic condition using the determined geographic location of the subscriber and data from the subscriber database; and then (g) automatically transmitting a traffic notification message to the identified subscriber to thereby provide updated relevant traffic information to the subscriber without requiring the subscriber to call, respond to prompts or enter a request to a remote traffic monitoring service for updated traffic information in transit.

Embodiments of the present invention are directed to methods for providing traffic congestion information from a traffic database to a subscriber over a wireless network. A telephone call is received from a subscriber's wireless telephone. The telephone directory number of the wireless telephone is detected, and it is determined whether the call is from a subscriber, and if so, where the subscriber is located and his direction of travel and/or the likely street or roadway the driver is on and/or approaching.

Embodiments of the present invention can provide a method for providing traffic congestion information from a traffic database to a subscriber over a wireless network. A telephone call can be received from a subscriber's wireless telephone. The telephone directory number of the wireless telephone is detected, and it is determined whether the call is from a subscriber. If the call is from a subscriber, the subscriber's present and intended destination locations, the desired traffic monitoring period, and the driver's location are evaluated. Relevant traffic information stored in the traffic database and/or traffic congestion information for the portion of the roadway that the driver is on and/or approaching in a projected travel window or boundary is retrieved based upon information maintained in the traffic database. The subscriber can pre-configure the subscriber database by performing the steps of entering a wireless directory telephone number, selecting a portion of a roadway or travel route and monitoring period, designating a commuting travel route or an irregular travel event, and the like. An audio and/or text preview of road conditions during a desired interval (typically in advance of the travel path at issue) can be relayed to the user (such as via SMS or text, audio or other suitable messaging system) over a wireless communication modality.

BRIEF DESCRIPTION OF THE DRAWINGS

FIG. 4 is a list of streets and distances for each possible route illustrated in FIG. 3.

FIG. 5 illustrates a calculation of the shortest route between two locations among the routes illustrated in FIG. 3.

FIGS. 9A-9C are a series of exemplary screen shots for pre-configuring the traffic predicting system by identifying routes in accordance with the flow diagram of FIG. 8.

FIG. 13 is an exemplary illustration of information stored in the subscriber database in FIG. 1, after a subscriber pre-configures the traffic predicting system according to FIGS. 12A and/or 12B.

FIG. 14 is an exemplary map illustrating present and intended destination locations of two fictitious subscribers and certain traffic advisories that may affect the subscribers' commutes.

FIG. 15 is a schematic of a scheduling database that is accessed by the traffic data processors in FIG. 1 to schedule the transmission of text messages to subscribers' wireless devices, in accordance with the third embodiment of the present invention.

FIG. 17C is a diagram of an automated traffic-location intelligent system that uses a global positioning system.

FIGS. 18-21 are flow charts of operations of methods, systems and/or computer program products that can be performed according to embodiments of the present invention.

DETAILED DESCRIPTION

Figure 1:
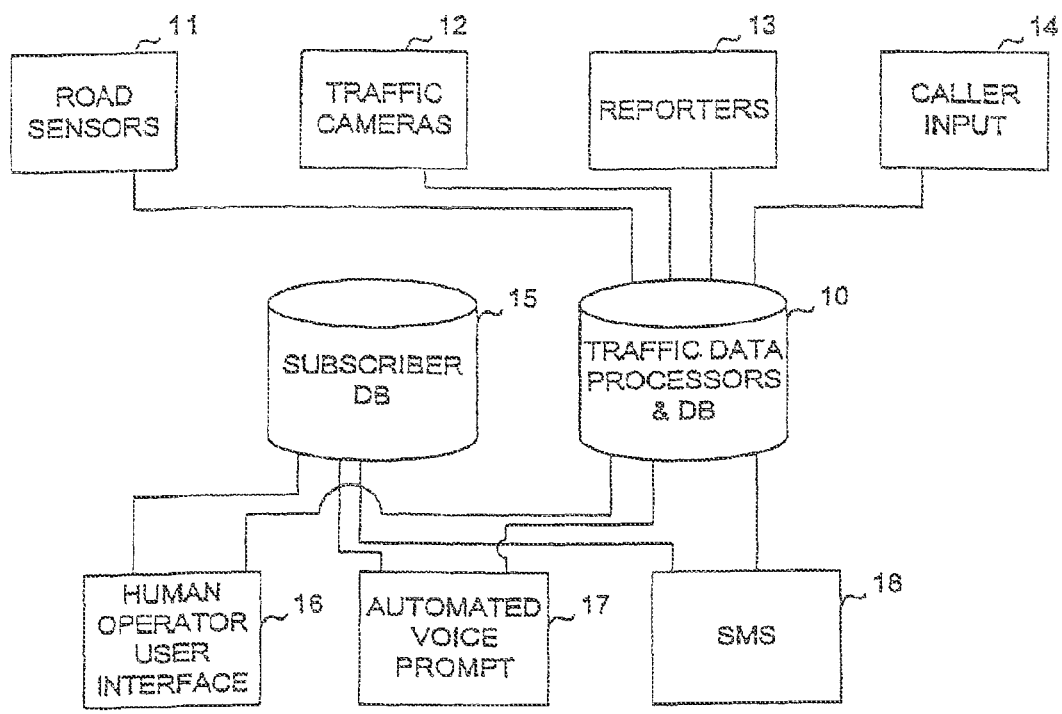
FIG. 1 is a schematic diagram of an exemplary traffic reporting system according to the present invention.

The methods and systems described herein provide for allowing users to access a database containing information pertaining to traffic conditions. Using the systems and/or methods, a driver can receive traffic conditions potentially affecting the driver's particular commute, just prior to (or during) the time at which the driver chooses between one or more routes or paths for the commute. Several embodiments are disclosed in accordance with the present invention by which the driver can easily receive timely traffic information from the system via the driver's wireless communications device, such as a wireless telephone.

In the figures, like numbers refer to like elements throughout. It will be appreciated that although discussed with respect to a certain embodiment, features or operation of one embodiment can apply to others. Broken lines in the figures indicate optional operations or features unless stated otherwise. The order of the steps in the claims is not limited to the order presented unless stated otherwise therein.

As will be appreciated by one of skill in the art, the present invention may be embodied as a system, method, data processing system, and/or computer program product. Accordingly, the present invention may combine software and hardware aspects, which may all generally be referred to herein as a "circuit." Furthermore, the present invention may take the form of a computer program product on a computer-usable storage medium having computer-usable program code means embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as, but not limited to, Java, Smalltalk or C++. However, the computer program code for carrying out operations of the present invention may also be written in conventional procedural programming languages, such as the "C" programming language. The program code may execute entirely on a computer associated with the parking lot system, as a stand-alone software package, partly on the parking lot system computer(s), partly on a user's computer and partly on a remote computer or entirely on the remote computer. In the latter scenario, the remote computer may be connected to the parking lot and/or user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

FIG. 1 is a schematic diagram of a traffic condition reporting system according to the present invention for providing traffic conditions to a driver. Traffic data processors and databases 10 receive and maintain traffic data for certain roads and highways in or nearby one or more metropolitan areas. The traffic information can be sorted and organized in the database according to geographic regions and/or particular stretches along a road (e.g., "Lincoln Drive between 1st and 5th Streets"), although the information may instead be organized differently without departing from the scope of the invention. For each entry, the database may store one or more fields of traffic information, such as an average speed of traffic (e.g., "20 mph"), advisories of traffic conditions (e.g., "all lanes open" or "traffic accident"), a code indicating the "drivability" of the road (e.g., a rating of 1-5, where 5 indicates that traffic is flowing smoothly), or a code indicating the "drivability" of the road in comparison with the typical traffic conditions on the road at that time (e.g., a numerical rating of 1-5, where 5 indicates a typical or "normal" traffic pattern for the road for that particular time such as morning or evening commute periods). Other such types of information may include the number of traffic lights within the given stretch of road, and for each traffic light, the number of traffic light cycles until a car can pass through the intersection. There are many possible formats for storing traffic data to enable users to quickly learn the severity of traffic conditions for a particular route.

Traffic information in the traffic database may be received from one or more of several possible sources. As in the system described at traffic.com, the traffic database may collect traffic information from road sensors 11 installed along particular roadways. This information may be reported through direct wireline communications, or through a wireless communications system. Road sensors can detect and report the average speed of traffic at a given location to the traffic data processors and databases 10. The speed of traffic information may then be processed in the traffic data processors and databases 10 to determine whether there is a traffic advisory or to calculate the "drivability" as explained above.

Traffic information may also be input to the traffic database in response to images transmitted from traffic cameras 12 along particular roadways. A traffic database operator can monitor the output from traffic cameras and determine the speed of traffic, traffic advisories, or the "drivability" along the road based upon a qualitative determination of the traffic being monitored. As another source of information, the traffic database operator may receive information from traffic reporters ("reporters")13 (e.g., helicopter traffic reporting services), and populate the traffic database according to reporters' subjective opinions. Although it may be less reliable, many radio traffic-reporting services rely upon wireless telephone caller input ("caller input") 14 for relevant traffic information.

It may be possible to provide incentives for commuters to provide such information to the traffic database operator (e.g., to receive a discount on traffic reporting service) to increase the reliability of the information. As another possible source for receiving traffic into the traffic database, it may be possible to determine the speed of travel through GPS systems installed in cars. This information could be communicated to the traffic database and sorted according to individual travel along identified regions such as proximate streets, roads, highways and the like. Other input channels can also be used, such as for example, State Highway or Public Safety Departments, State Department of Transportation travel alerts (which traffic information can be typically posted to local radio channels (AM or FM station) or overhead information displays).

A subscriber database 15 can be configured to maintain account information for each user seeking information from the traffic data processors and databases 10. Subscriber database 15 may simply maintain a list of cellular telephone numbers for each current subscriber. Depending upon the subscriber plan, the database may also maintain additional information, such as the date and time that the user placed a call to access the traffic database, the format by which the user wishes to receive traffic information, and the streets and directions for certain routes that are often traveled by the subscriber. There are several embodiments of the present invention by which a user can access information maintained in the traffic database, as will now be described.

Several exemplary embodiments are described which a user can use to access traffic information stored in traffic data processors and database 10. In one embodiment of the present invention, a driver can call an administrative telephone number and contact a human operator via a human operator user interface ("interface") 16, who accesses a computerized traffic database and determines the most efficient route for the driver to take in response to the driver's request. In a second embodiment, a driver pre-configures a traffic reporting system by first providing information to a database concerning the driver's typical destinations and the driver's preferred routes for reaching these destinations. While en route, the driver can then call an administrative telephone number with a wireless telephone, and interact with a voice-automated system ("automated voice prompt") 17 to describe the driver's intended destination and to receive a short audio message reporting the shortest route. In a third embodiment, the driver also pre-configures the traffic reporting system by providing information identifying the driver's preferred routes for reaching a destination, and the typical range of times when the driver is commuting. While driving, short message service ("SMS") messages 18 (also known as "text messages") are provided over the display of the driver's associated wireless telephone during the range of times when the driver is commuting, to advise the driver which of the preferred routes to choose.

Figure 2:
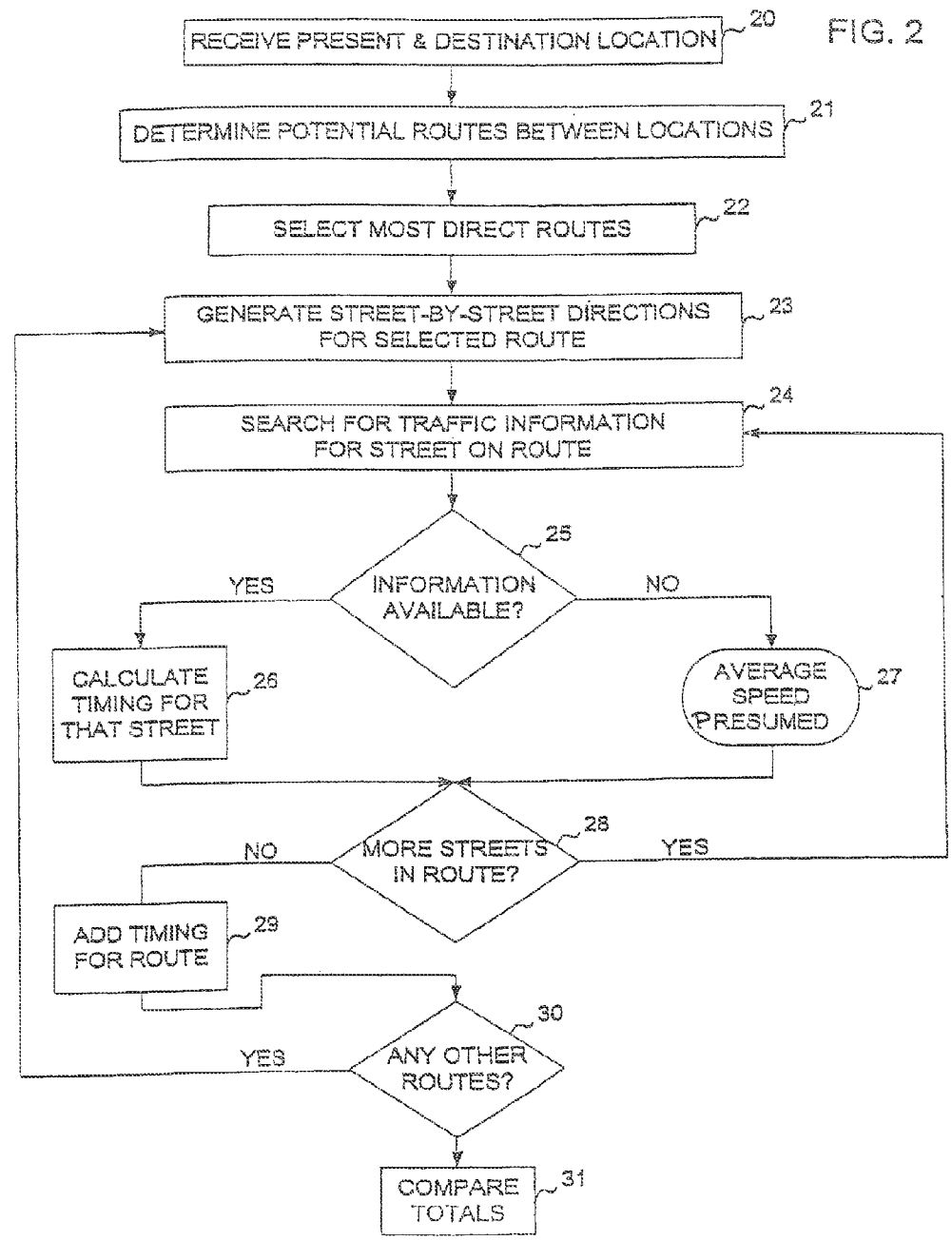
FIG. 2 is an exemplary flow diagram according to the present invention, in which the shortest route between two locations is selected from a plurality of routes according to information stored in a traffic database.
Figure 3:
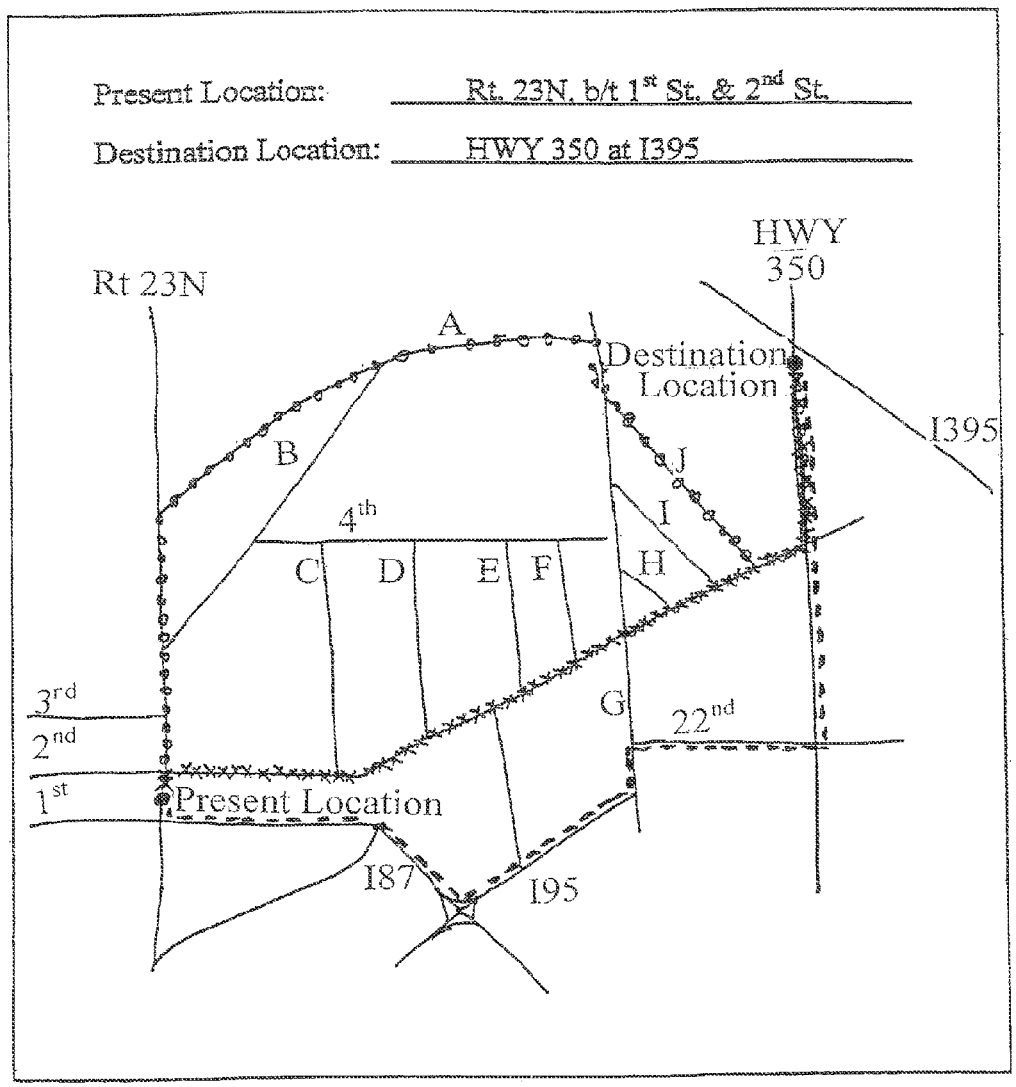
FIG. 3 is an exemplary graphical representation of possible routes as selected by a driver between two locations for a graphical user interface for the traffic reporting system in FIG. 1.

FIG. 2 provides an exemplary flow diagram in which a shortest route between two locations is determined from a plurality of routes by referring to information stored in traffic data processors and database 10. In step 20, the driver's present and destination locations are input to a traffic advisory program. Using a mapping program, all potential routes between the two locations can be determined, in step 21. The system can then temporarily select and store a certain number of the most direct routes (e.g., the five (5) most direct routes) in step 22. An example of a graphical representation of the temporarily selected routes is provided in FIG. 3 (all reasonably possible routes would be selected). For each of these selected routes, a list is generated indicating the street-by-street directions (e.g., (1) Rt. 23 N., b/t 1st St. & A St., 3 mi.; (2) A St. W., b/t Rt. 23 & G St., 6 mi.; (3) Fourth St S. b/t A St. & J. St., 5 mi, etc.), in step 23. An example of lists for two of the selected routes from FIG. 3 is provided in FIG. 4. As can be seen in FIGS. 3 and 4, although some routes appear to be more direct, these routes may have more cross streets with traffic lights, or may otherwise have traffic advisories with a reduced drivability rating during the travel period.

The traffic advisory program can then determine the shortest (time wise) of the selected routes by retrieving information from the traffic database. For each route, the system performs a database search, in step 24, and checks for each highway, street, or road in the list to determine if there is any relevant traffic information stored in the database, in step 25. If there is information in the database, it is retrieved and factored into the calculation for determining the shortest route, in step 26. For example, if the traffic database indicates that drivers are only traveling at 20 mph on a particular stretch of the road, and the road is ten miles long, then it will probably take the driver a half hour to traverse that part of the route. As another example, the traffic database may store information indicating that there are five traffic lights along the route, and for each light, it may also store the timing cycle (e.g., number of seconds that the light is "green" and number of seconds that it is "red") and the number of cycles required for a typical driver to pass through the intersection. The traffic advisory program can combine all of this information to determine a length of time for the driver to commute along that route at that particular time. If there is no information in the database, an average speed is presumed, in step 27, which may be based upon the posted speed limit and the typical rate of speed for the road.

In certain embodiments, recent or current police reports as well as weather advisories can be used to help define the "drivability" ranking of a particular roadway or path. The police reports may include crime reports, accidents, planned roadblocks, planned enforcement activities and/or the (average) number speeding tickets given over a desired time interval. In certain embodiments, substantially real-time speeding ticket events may be monitored (such as input by drivers witnessing the event and relaying the information to a data collection site or by monitoring police or public records) and posted to the database to help drivers avoid these roadways as appropriate.

After determining that each entry in a list has been checked in the traffic database, in step 28, the traffic advisory program adds the time for each entry to calculate the total time associated with the route, in step 29. The traffic advisory program then checks whether there are any other lists to check, in step 30. Once all lists are checked, a comparison of the calculated commuting times can be made, in step 31, to determine which route will allow the shortest commute.

FIG. 5 provides an example of the process for determining the shortest route, based upon the routes illustrated in FIG. 4. As can be seen, for each route, a total time to travel each stretch of road is calculated, incorporating delays for traffic advisories and the number of traffic lights. Although not shown in FIG. 5, it is also possible to factor the timing of each traffic light, which may change during different times of the day, and the number of cycles of the traffic light that occur before a typical driver can travel through the intersection. To calculate the estimated time required to travel each stretch of road, the number of miles to be traveled along the road is divided by the estimated speed of traffic along the road, and this result is added to the number of minutes of anticipated delay resulting from the number of traffic lights. The estimated speed of traffic is determined by subtracting a traffic advisory "factor" from the average speed of traffic on the road. In FIG. 5, the most time efficient route is Route "A," even though other routes are geographically more direct.

After determining the predicted best route, this information can be reported in time for the driver to choose a route to avoid congested roads and congested traffic intersections. The following is a description of embodiments by which the traffic advisory information can be reported to a driver.

I. Exemplary Human Intermediary Embodiments

In one embodiment of the present invention, a subscriber to a traffic monitoring service indirectly accesses the database through a human operator user interface 16. After determining that the user is a subscriber, the human operator receives a traffic question from the user as a spoken request over the user's wireless telephone. The operator types the request for traffic information into traffic data processors and database 10, receives the information, and reports the information back to the user. Using a human intermediary is a relatively easy method for a user to access the database to receive traffic information. The user's local telephone company may provide this service in conjunction with "directory assistance," or the service may be provided by another company that monitors traffic information in the user's metropolitan area.

Figure 6:
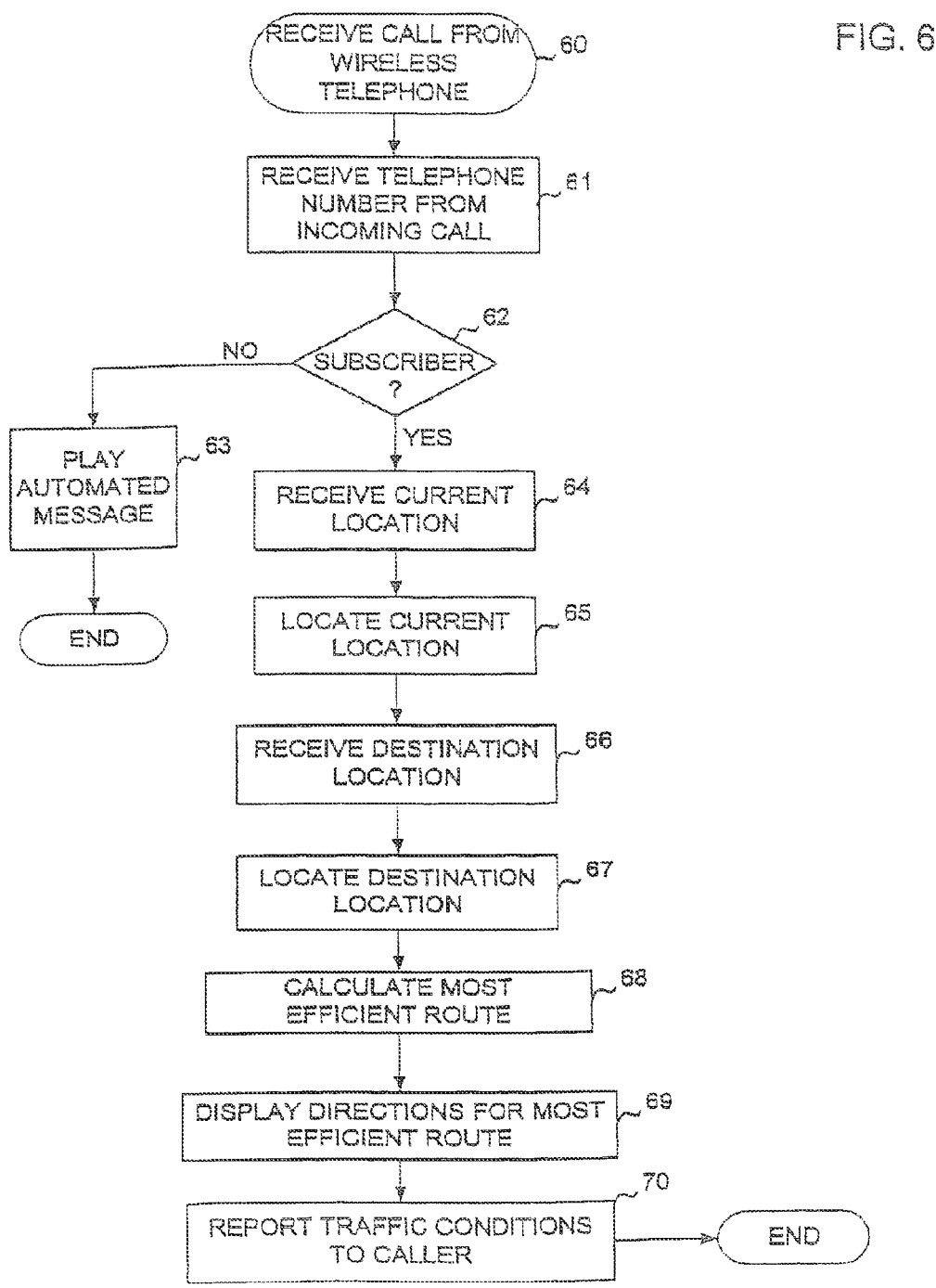
FIG. 6 is a flow diagram illustrating a method for receiving traffic information via a human operator intermediary, according to the first embodiment of the present invention.

FIG. 6 is a flow diagram illustrating a method for receiving traffic information via a human operator intermediary. While traveling, but prior to the time that it is necessary to choose between one or two possible routes, a caller dials a telephone number to speak with an operator at a travel advisory service. Upon receiving the call at a human operator station, in step 60, the caller's wireless telephone number is automatically provided (as a "caller ID"), in step 61. This telephone number is checked against a list of current subscribers in the subscriber database to determine whether the caller is a current subscriber, in step 62. If the caller is not a subscriber, an automated message is played, in step 63, and the call is disconnected. Alternatively, the caller can be transferred to a subscription line where a credit card or other form of payment can be relayed, along with other appropriate data and the subscriber added as a new subscriber to the database.

If the caller is a subscriber, the subscriber is prompted, either by a human operator or through an automated voice prompt, to provide the subscriber's present location, and the system receives this information in step 64. This information is entered into a mapping system to locate the subscriber's present location, in step 65. The subscriber is also prompted to provide a destination location and this is received in step 66 and entered into a mapping system to locate the subscriber's intended destination, in step 67. Using speech recognition technology, it is possible to automatically enter this information, if it is provided in a correct format.

In certain embodiments, such as in an exemplary implementation, once the subscriber's present and destination location is entered, a program calculates the most time efficient route for the subscriber's commute in step 68, based upon both traffic conditions and mileage. An example of a flow for a traffic advisory program is provided above with reference to FIG. 2. In a more simplified implementation, software can be created that displays a roadmap of the relevant section of the metropolitan region and overlays the two or three shortest possible routes with traffic advisory information for those routes. Based upon this visual description, a human operator may be able to formulate an opinion as to which is the preferred route. This implementation may be particularly useful when the driver is only choosing between two roads (e.g., the highway or the back streets) and only wants to know whether there are any unexpected travel advisories on either of the two roads. Directions for the most efficient route, calculated in step 68, can be displayed in step 69, and traffic conditions can be reported to the caller in step 70.

Figure 7:
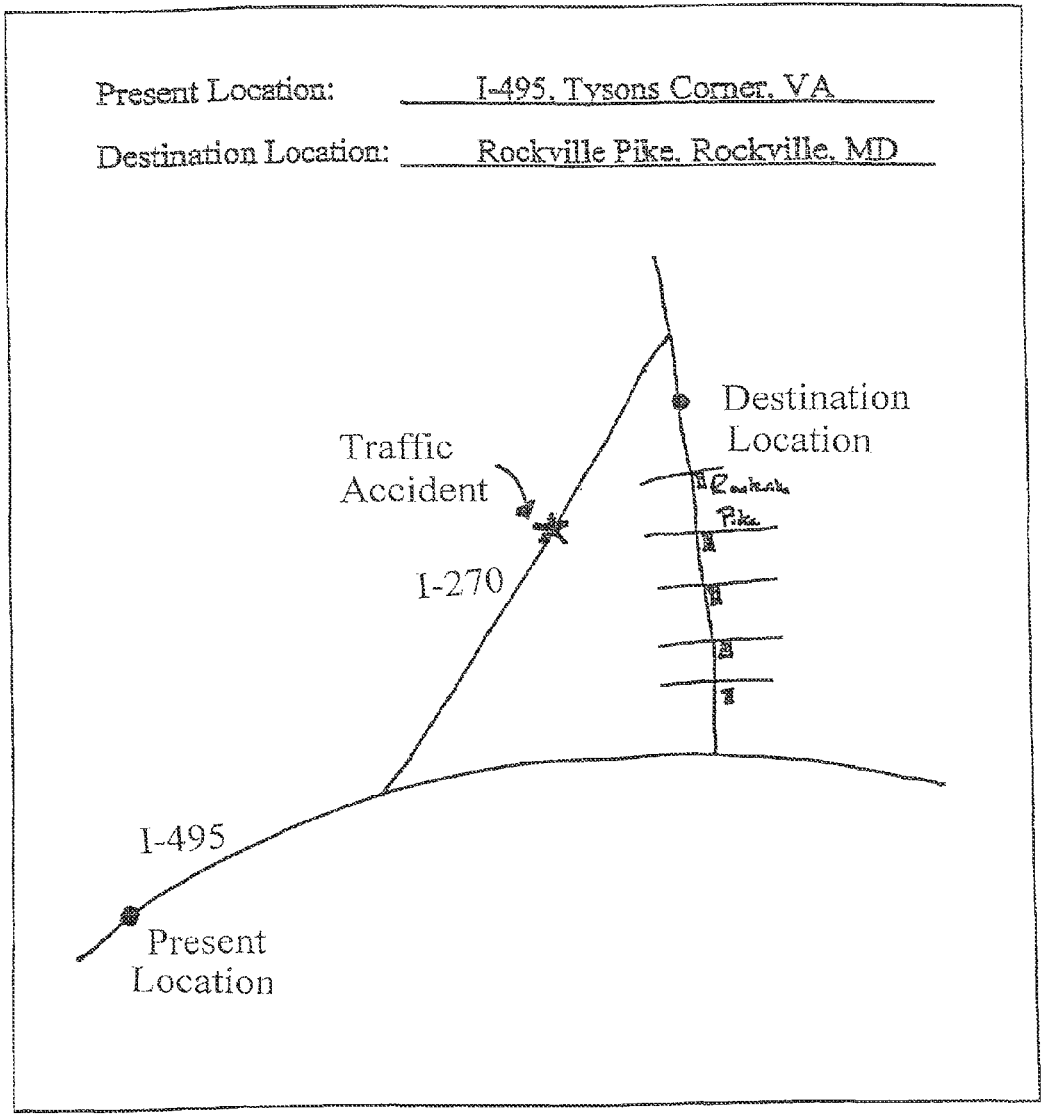
FIG. 7 provides an exemplary map illustrating differences in traffic conditions between two possible routes to the same destination that can be reported to drivers via the first embodiment of the present invention.

FIG. 7 provides an illustration of an example in which a driver could easily benefit from contacting a human intermediary to receive traffic information. In this example, the driver will soon choose whether or not to take a bypass route ("1-270") to travel to his intended destination ("Rockville Pike"). Upon providing this information and accessing the traffic database, an operator can recommend against taking the bypass route due to an accident that recently occurred on a road that is along that route or other reduced drivability data.

II. Exemplary Pre-Programmed Automated Embodiments

In another embodiment, a driver can pre-configure a traffic informational system by first providing information concerning the driver's typical destinations and the driver's preferred routes for reaching these destinations. This information can be entered into a database in accordance with a web-based program or other suitable input method. While en route, the driver can then call an administrative telephone number with a wireless telephone and respond to prompts from a voice-automated system to indicate the driver's intended destination. The automated system then accesses a computerized traffic database and determines which of the driver's preferred routes will allow the driver to reach the destination in the least amount of time. The preferred route can be provided as a short audio message on the driver's wireless telephone or other communication device.

Figure 8:
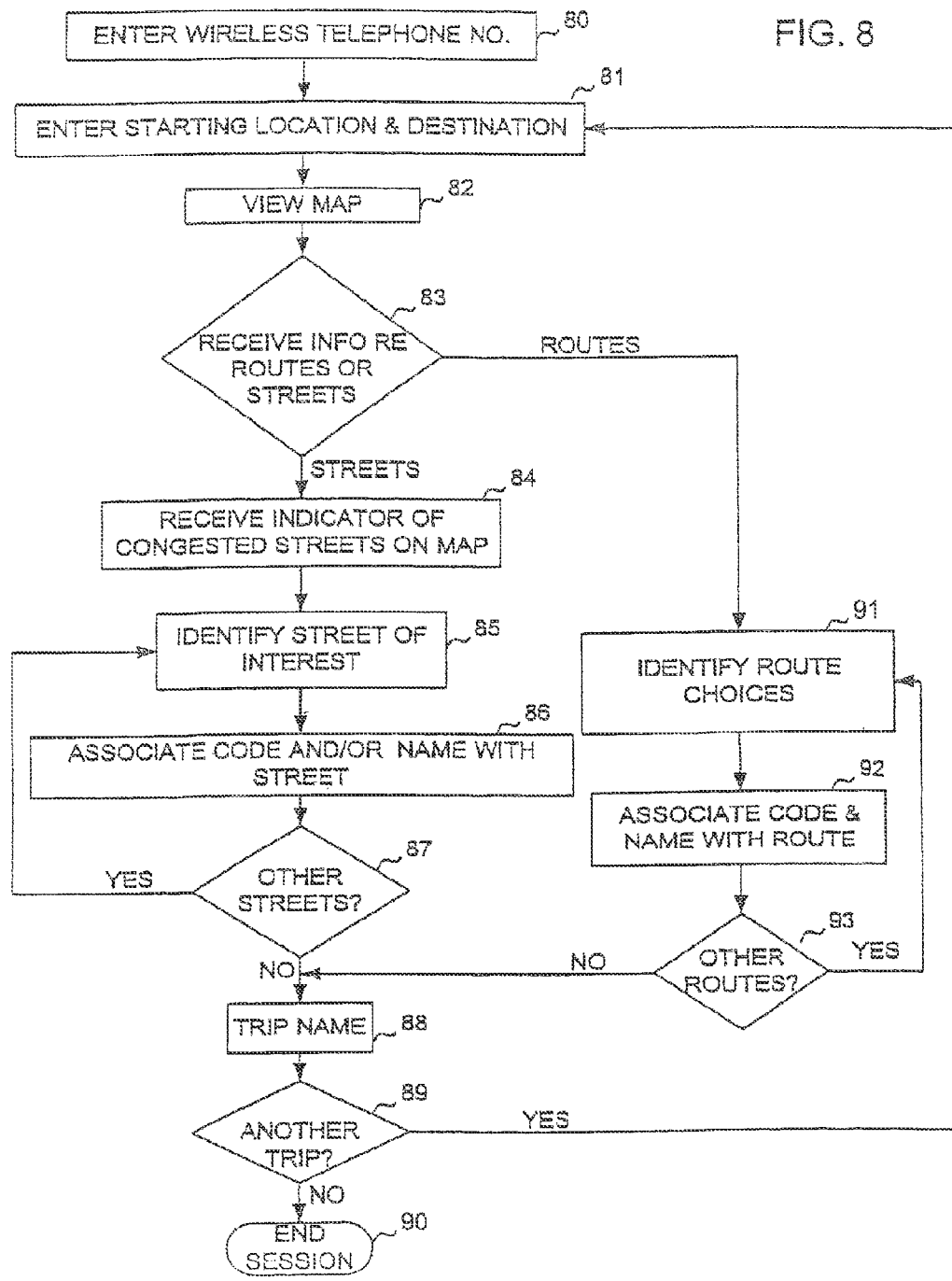
FIG. 8 is a flow diagram illustrating the steps for pre-configuring a traffic predicting system according to a second embodiment of the present invention.

For example, in an exemplary implementation, a driver accesses a web site to subscribe to the traffic monitoring service. The web site enables the driver to pre-configure a subscriber database to provide specific traffic information in response to calls from the subscriber's wireless telephone. FIG. 8 is a flow diagram illustrating the steps for pre-configuring the traffic predicting system according to the pre-programmed embodiment.

The web site requests the driver to first enter a wireless directory telephone number, in step 80. When the driver calls to receive traffic information, this number can be scanned (e.g., by caller-ID) to identify the driver as a subscriber. The driver/passenger is also prompted to provide a starting location and a destination location, in step 81. Using this information, the web site generates a roadmap, which can be viewed in step 82. The roadmap shows the starting and ending locations and the relevant streets by which the driver may choose to travel. Optionally, the driver may be prompted to enter additional information, such as preferred travel times (both morning and evening).

In one exemplary implementation, the driver can choose in step 83 to either receive information concerning congestion on particular, identified streets, or a recommendation of one particular route from a plurality of possible routes based upon current traffic conditions. If the driver chooses to receive information pertaining to particular streets, an indication of which streets typically experience congestion and are monitored by the service is provided on the road map, as shown in step 84. Using the graphical interface, the driver identifies the stretches of particular streets that he wishes to monitor (e.g., 1-495 between 1-270 and Old Georgetown Rd.) in step 85. The driver can then associate a code or a name with this stretch of road (e.g., "beltway" or "1") in step 86. Although not shown in FIG. 8, the system can prompt the driver to refrain from re-using a name or code, or the system can perform a check to determine whether a proposed name or code has previously been used by the driver. Instead of typing in a name or code, the driver may also be able to speak the name into a microphone, which is then digitally recorded for use with a speech recognition system.

The driver can then choose whether to select another road, in step 87. Once the driver has completed selecting roads to monitor, the driver selects a name or code for the trip (e.g., "commute home" or "1"), in step 88, and selects whether to pre-configure monitoring for a different trip, in step 89, and repeat the process.

If, in step 83, the driver elects to receive recommendations from the service of which route to take, the driver may identify a preferred route on the map by selecting stretches of road in the user interface, in step 91. Once the driver identifies the complete route, the driver provides a code or a name for the route (e.g., "highway to work" or "back roads to work") in step 92. The user then selects one or more additional routes in step 93, for the system to compare in determining the quickest route with the minimum traffic.

Figure 9A:
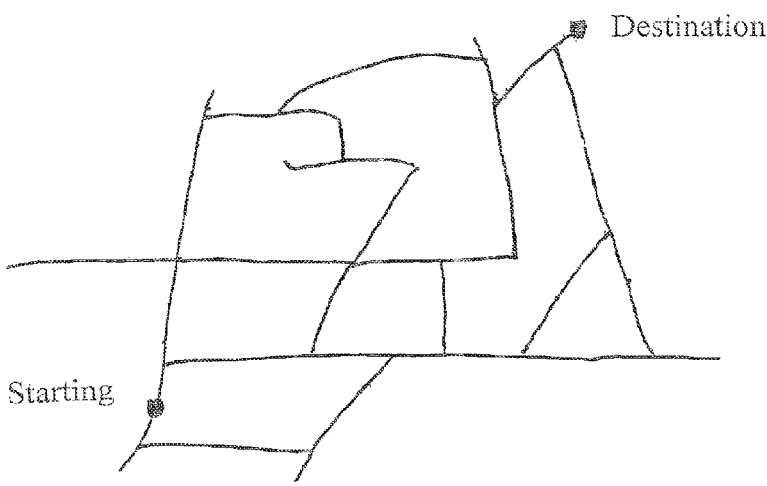
Figure 9B:
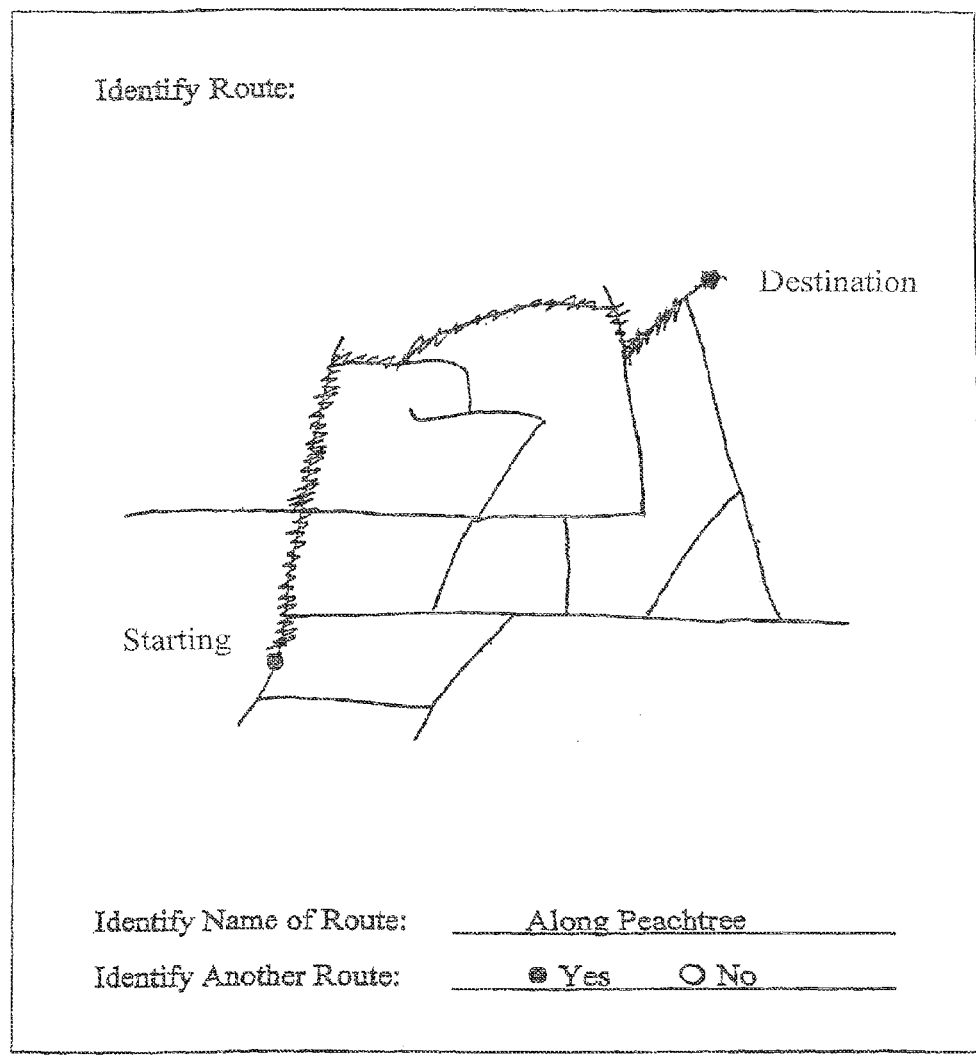

FIGS. 9A-9C together provide an example of how a driver may preconfigure the traffic monitoring service on a web site according to the second embodiment of the invention. In FIG. 9A, after providing a telephone number and a starting and destination location, a road map is provided of the relevant portion of the metropolitan area that includes the two locations. In this example, the driver chooses to receive information for the driver's chosen routes. FIGS. 9B and 9C illustrate the process of selecting two routes, named "Along Peachtree" and "Along Midtown," respectively. The routes can be selected by "touching", "clicking" and/or "dragging" on visually generated portions of selected streets on a display.

Figure 10A:
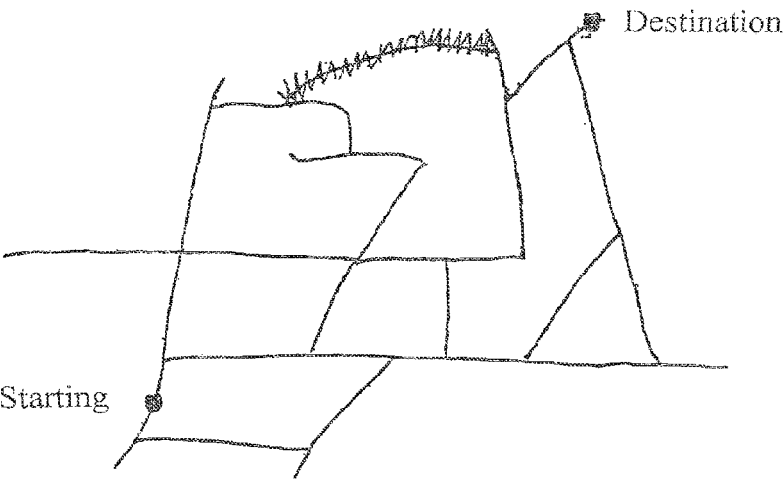
FIGS. 10A-10B are a series of exemplary screen shots for pre-configuring the traffic predicting system by identifying streets in accordance with the flow diagram of FIG. 8.
Figure 10B:
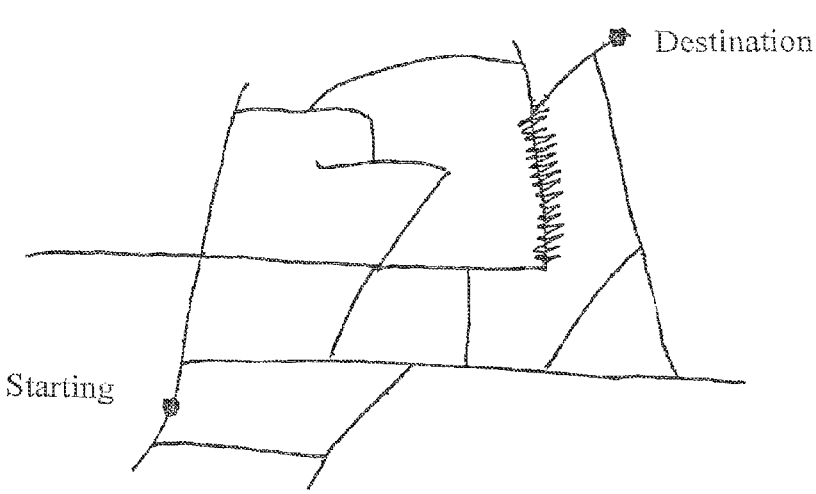

FIGS. 10A-10B, together with FIG. 9A, provide another example of how a driver may pre-configure the traffic monitoring service. In this example, the driver selects two streets to be monitored, named "Third Street" and "Jay Street," respectively.

Figure 11:
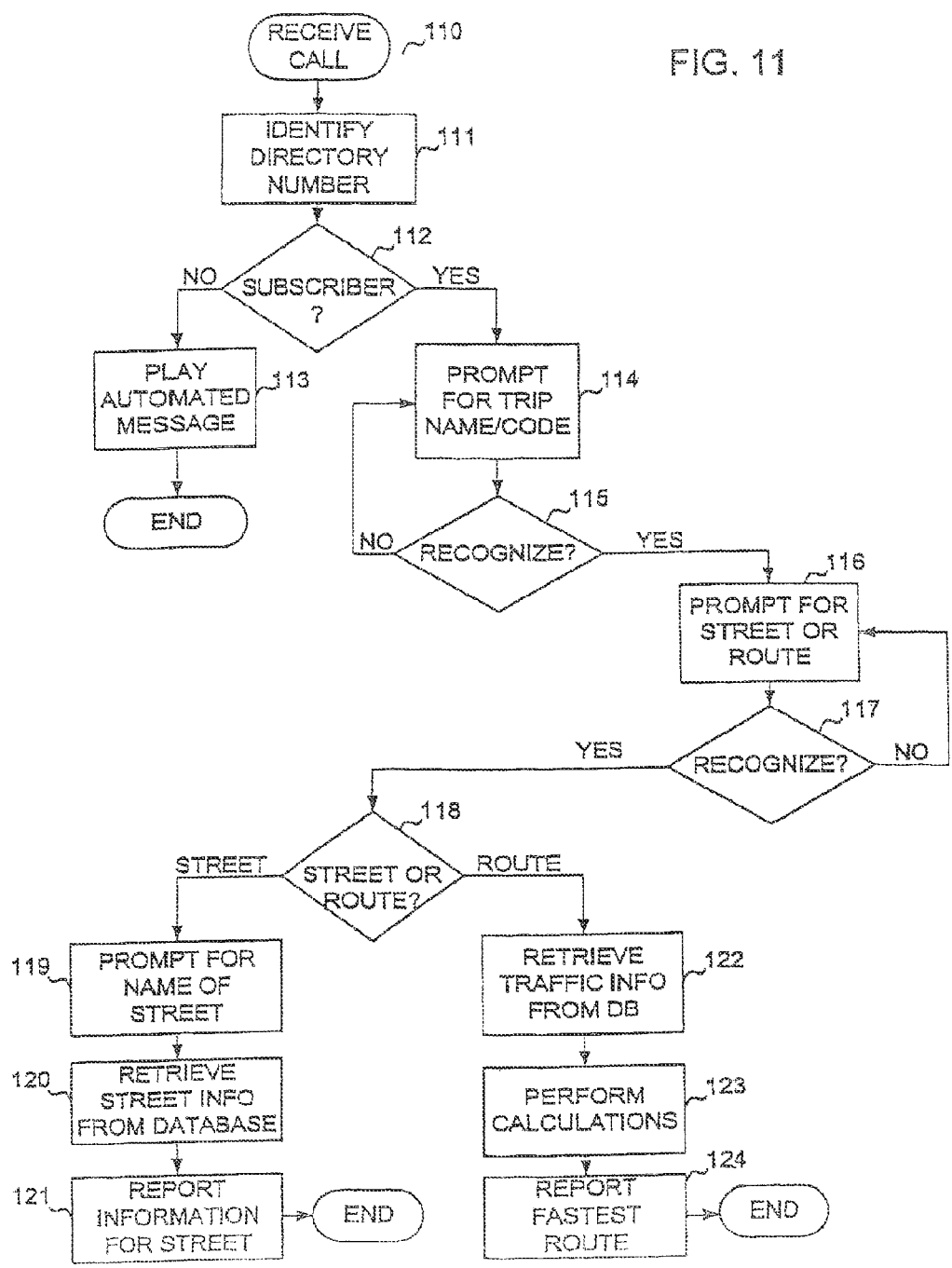
FIG. 11 is a flow diagram illustrating the steps for accessing traffic information using an automated system according to the second embodiment of the present invention.

When the driver is traveling, he/she can then call an administrative telephone number to access the automated traffic monitoring service and receive traffic information in accordance with the driving information provided during the pre-configuration on the web site. FIG. 11 is a flow diagram illustrating the steps for accessing traffic information using an automated system according to the second embodiment of the present invention.

Once a call is received at the traffic monitoring service, in step 110, the wireless directory telephone number is detected, in step 111. If the system determines that the caller is not a subscriber, in step 112, then an automated message is played over the caller's telephone, in step 113. If the caller is a subscriber, he is then prompted to provide the name or the code number for the trip that is in progress, in step 114. The subscriber can then press one or more keys on the wireless telephone, or simply speak the name. If the name is spoken, the system attempts to recognize the name using known speech recognition systems. Information pertaining to the subscriber's trips are stored and maintained in the subscriber database. If the name or code is recognized, in step 115, then the subscriber is prompted to indicate the process of selecting two routes, named "Along Peachtree" and "Along Midtown," respectively. The routes are selected by "clicking" and "dragging" on portions of selected streets.

FIGS. 10A-10B, together with FIG. 9A, provide another example of how a driver may pre-configure the traffic monitoring service. In this example, the driver selects two streets to be monitored, named "Third Street" and "Jay Street," respectively.

When the subscriber (driver or passenger) is traveling, he/she can then call an administrative telephone number to access the automated traffic monitoring service and receive traffic information in accordance with the driving information provided during the pre-configuration on the web site. FIG. 11 is a flow diagram illustrating the steps for accessing traffic information using an automated system according to the second embodiment of the present invention.

Once a call is received at the traffic monitoring service, in step 110, the wireless directory telephone number is detected, in step 111. If the system determines that the caller is not a subscriber, in step 112, then an automated message is played over the caller's telephone, in step 113. If the caller is a subscriber, he is then prompted to provide the name or the code number for the trip that is in progress, in step 114. The subscriber can then press one or more keys on the wireless telephone, or simply speak the name. If the name is spoken, the system attempts to recognize the name using known speech recognition systems. Information pertaining to the subscriber's trips are stored and maintained in the subscriber database. If the name or code is recognized, in step 115, then the subscriber is prompted in step 116 to indicate whether to search for information pertaining to a road or a comparison of one or more routes (e.g., "press '1' for streets, press '2' for routes . . . ). If this response is not recognized, in steps 117, then the system can continue to prompt the subscriber for the appropriate command.

If it is determined in step 118 that the subscriber chooses to receive information about a particular street, then the system prompts the user to indicate the street name by either speaking the name or pressing a code for the street name, in step 119 ("press '1' for "Third Street;" press '2' for "Jay Street"). The information pertaining to which streets are associated with the subscriber is stored in the subscriber database. In step 120, the information pertaining to the identified street name is retrieved from the traffic database. This information is then reported to the user through a simulated voice (e.g., "caution, Jay Street is running slowly with unusually heavy traffic, we suggest a different route if possible"), in step 121.

The subscriber may instead choose to compare the estimated travel times between a plurality of routes that were pre-configured and associated with the identified trip name. The system retrieves information from the traffic database for each street in each route, in step 122. The estimated travel time is calculated for each leg of the route, and the total travel time for each route is determined in step 123, in a manner as described with reference to FIG. 2. This information is then reported to the subscriber through a simulated voice (e.g., "take 'Along Peachtree,' it is the fastest route") in step 124. Thus, referring to FIGS. 9A-C and 10A-B, a subscriber can easily determine whether to take the "Along Peachtree" or "Along Midtown" routes, or to take or avoid either of "Third Street" or "Jay Street."

III. Exemplary In-Transit Update and/or (Short) Messaging Service Embodiments

Figure 12A:
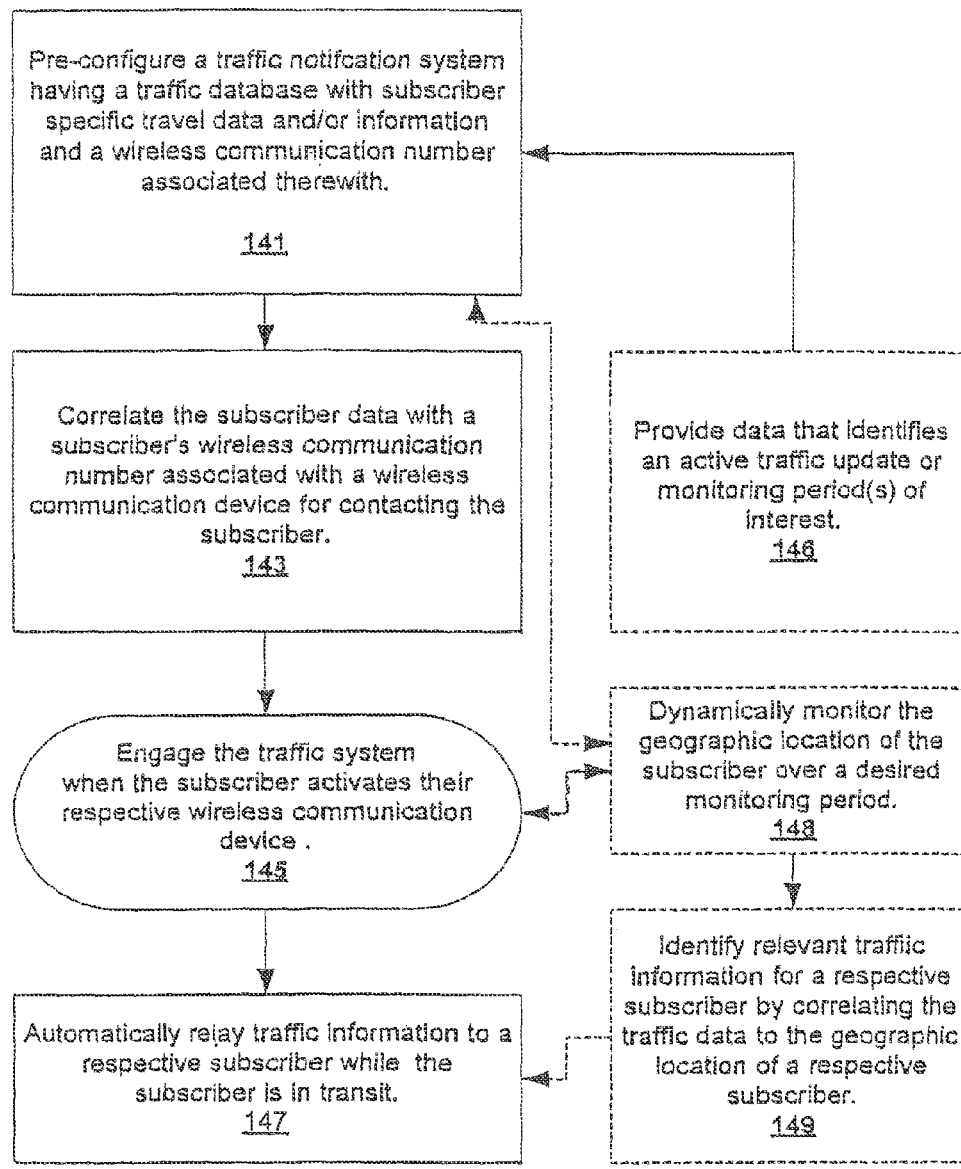
FIG. 12A is a flow diagram of operations that can be used to carry out embodiments of the present invention.

In third embodiments, referring to FIG. 12A, the driver can pre-configure a traffic notificating (predicting) system (block 141) such as by providing information identifying the driver's preferred routes for reaching a frequent destination, and optionally, the typical range of times when the driver is commuting. In addition and/or alternatively, the driver can pre-configure a traffic predicting system by providing trip-specific data such as anticipated dates of travel, starting and ending locations, planned route, planned breaks or night stops and the like.

The information stored in the database is associated with the driver's wireless telephone number or other unique identifier associated with a subscriber vehicle or wireless communication device (for example, an on-board navigation system such as an ONSTAR system) (block 143). When in use, short message system messages ("text messages") and/or audio messages are provided (such as over the display and/or via the speaker of the driver's associated wireless communication device), which may be a wireless telephone, during the range of times when the driver is commuting or during a desired monitoring interval or time of interest (block 146) to advise the driver. The advice can include which of the (preferred) routes to choose, provide periodic updates in traffic conditions, and/or report dynamically occurring traffic events that are in the geographic region of the driver.

A difference between the Traffic Update or (Short) Messaging Service embodiment and both the human intermediary embodiment and pre-programmed automated embodiment is that the driver can receive requested information and/or updates simply by turning on the driver's wireless device, activating a "function" key or the like on the wireless device, and/or turning "on" a vehicle (the latter typically for vehicle mounted wireless communication devices) which automatically engages the traffic system (block 145). The interface with the traffic system can occur without requiring the driver to make an active input transmission or communication request (without inputting responses to multiple prompts) such as a telephone call to a service number to initiate the request for update or traffic information. Traffic information can be automatically relayed to the subscriber/driver while a respective subscriber is in transit (block 147).

The interface or active monitoring or access to the traffic system may be predicated on whether the driver has indicated this time as being of a desired monitoring period of interest (block 146). In addition, the geographic location of the subscriber may be monitored dynamically over a desired monitoring period (block 148) and relevant traffic information provided for a respective subscriber by correlating the current identified geographic location (and or travel direction) to traffic data in that geographic location (i.e., the traffic data can be customized to the substantially real-time location of the subscriber) (block 149). If the traffic data has not changed since the last update and the subscriber is still within the same geographic location, the update may be withheld or delivered on a less-frequent basis. If however, a new traffic condition is determined in a proximate geographic region, the traffic notification can relay the information based on the location of the subscriber (typically in substantially real-time from when the new condition is determined or relayed to the traffic system while the subscriber is in-transit) (block 149).

Figure 12B:
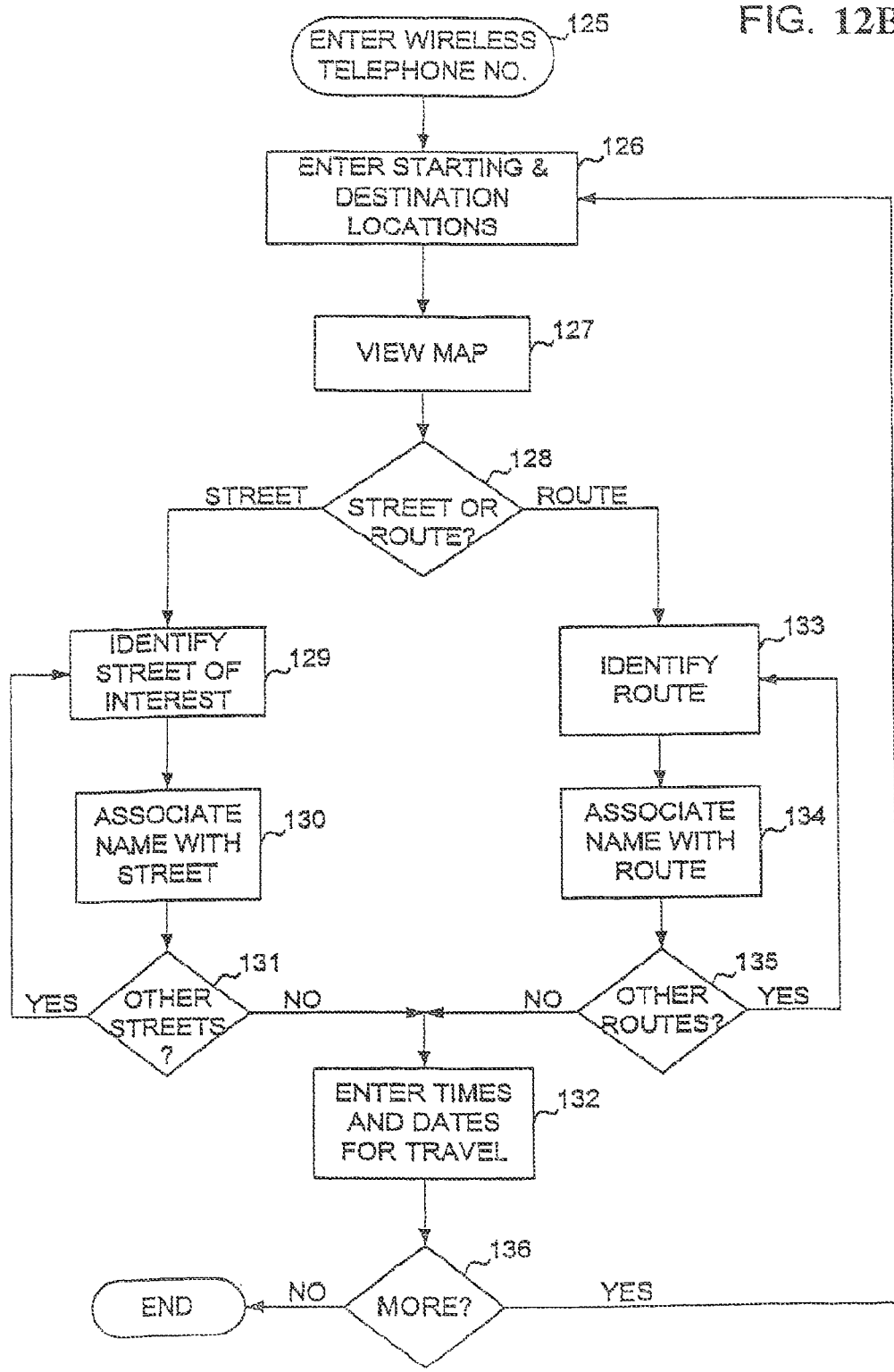
FIG. 12B is a flow diagram illustrating the steps for pre-configuring a traffic predicting system in a first exemplary implementation of a third embodiment of the present invention.

FIG. 12B is a flow diagram illustrating exemplary steps for pre-configuring the traffic predicting system in a first exemplary implementation of Short Messaging Service embodiments. As used herein, the terms "Short Messaging Service" or "SMS" can include email messaging, instant messaging or any text or audio messaging system used with a wireless communication device to provide traffic notification information. The "short" message is typically less than about a paragraph long if textual, and more typically about 1 sentence long and may not be presented in grammatically proper format. The short message can be less than about 15 seconds in length if audio, and typically less than about ten seconds in duration, The short message may be provided as both a text message and an audio message, which is output by the wireless device associated with the subscriber. The system may be configured to provide additional information upon request if the subscriber so indicates.

As in FIG. 8, the web site requests the driver to first enter a wireless telephone number, in step 125, and a starting location and a destination location, in step 126. Optionally, if the service is associated with the driver's wireless network, it is possible that the web site will automatically detect the driver's wireless number upon receiving the driver's name. Once again, the driver then views a map in step 127, illustrating the starting and destination locations within the metropolitan area.

If the driver chooses in step 128 to receive information about a particular street, he identifies the street on the map in step 129 and selects a name for the street in step 130. If in step 128, the driver chooses to receive information about which is the most efficient route, he then identifies a route in step 133, associates a name for the route in step 134, and repeats the process to enter other alternative routes for comparison. In this implementation, the driver may elect to receive information for other streets or routes in steps 131 and/or 135. In step 132, the driver then enters the anticipated range of times and day(s) of the week for travel (e.g., weekdays, weekends, or a particular day of the week). In step 136, if the traffic predicting system is to be pre-configured for additional routes, the process can return to step 126 and repeat.

FIG. 13 provides an example of an entry in the subscriber database pertaining to the traffic information that a particular subscriber has requested to receive by pre-configuring the traffic predicting system in accordance with the steps described with reference to FIG. 12B. As is shown, the subscriber database stores the names of the particular streets and the times that the subscriber expects to be traveling on those streets (e.g., "Hallowell Dr., N., May 10, 2001: 0800"). The database also stores information pertaining to a plurality of routes between two locations to enable the system to determine the fastest route (e.g., "Along Cherry Valley" versus "Along Highway") considering the traffic conditions at the requested times (e.g., "8:00 am Weekdays"). The subscriber database automatically stores the number of miles for each leg of each route, and associates each street with a code for accessing the traffic database. At the time requested by the subscriber, or at regular intervals between the times provided by the subscriber if a time range is provided, the traffic predicting system performs a calculation as illustrated and explained with reference to FIG. 5 to determine the most direct route.

FIGS. 14 and 15 provide an example of how the short messaging service embodiment may be used. In this example, "Joe" and "Sam" are two fictitious drivers who subscribe to the service and have pre-configured the subscriber database with the following information: "Joe" intends to travel between points A and B at 8:00 am on weekdays (Monday through Friday) and prefers to travel by either taking the "Along Cherry Valley" route or the "Along Highway" route; and "Sam" intends to travel between points C and D at 12:00 pm on weekends, and desires to know the traffic conditions along "Highway" before deciding whether to take "Highway" or "Fox Street." FIG. 14 is a map of the region that includes the present and intended destination locations of Joe and Sam, and shows certain traffic advisories that may affect Joe and Sam's commutes. FIG. 15 is a schematic of a scheduling database that is accessed by the traffic data processors and databases 10 in FIG. 1 to schedule the transmission of text messages to subscribers' wireless devices.

Continuing with this example, Joe leaves his home at point A at 7:55 am on Tuesday to begin his commute, and turns his cellular phone "on" while in his car. As can be seen in FIG. 15, entry number 5 in the scheduling database indicates that at 8:00 am on Tuesday, the system is to compare the traffic conditions on two specified routes and report which is the faster of the two routes to Joe's telephone number at 555-1212. As shown on the map in FIG. 14, the system can detect that there is an accident that is slowing traffic on "Cherry Valley," and so the system will recommend that Joe should avoid the route that includes "Cherry Valley." Therefore, at 8:00 am, a short text message will be displayed on Joe's telephone that reads: "Along Highway," based upon the name of that route that Joe provided during the pre-configuration of the system.

Sam leaves his gym at point C at noon on Saturday to return home to point D, and also turns his cellular phone "on" while in the car. As can be seen in FIG. 15, entry number 6 in the scheduling database indicates that at noon on weekends, the system is to evaluate the traffic conditions on "Highway" and report the conditions to Sam's telephone number at 999-1234. The map shows that there is a road construction on "Highway," creating traffic congestion. This information is reported to Sam via a text message. Upon learning of the road construction, Sam can opt to take Fox Street back to his home to avoid the traffic.

There are several other exemplary implementations for utilizing a short messaging service to report traffic information from a traffic database to a wireless subscriber. In a second exemplary implementation, the traffic reporting system transmits a plurality of short (typically text) messages to the wireless device at the time that the subscriber is beginning his commute, and the wireless device stores the messages that are received. Later, the subscriber can access the stored information by pressing different keys on the keypad of the wireless device. In this implementation, the subscriber database can be pre-configured to include all of the information as provided in FIG. 13. However, in addition to, or instead of receiving a message recommending a particular route, the subscriber can receive a message pertaining to the traffic conditions for each different street in the route or for routes having negative traffic drivability ratings. The subscriber can then toggle through the messages at a safe, appropriate time (e.g., at a red traffic light) when the subscriber desires. Alternatively, the series of text messages can provide directions for the subscriber for the most direct route in light of the current traffic conditions. The subscriber can then cycle through the text messages to navigate the route, at a pace that is controlled by the subscriber.

In this second implementation, the text message that is transmitted to the subscriber's wireless device can begin with header code that instructs the wireless device where to store (or whether to overwrite) the information in the device's RAM memory. Wireless devices easily can be designed to parse through the header of a short text message to detect a storage information code. The wireless device can also be programmable to press a certain button to remove the information from the device (e.g., "Clear") or alternatively, to save the information in the device's long term memory.

In a third implementation of the short messaging service embodiment, the traffic reporting system automatically reports traffic conditions for particular streets to a subscriber whenever the subscriber is beginning to approach or is in the vicinity of those streets or when a subscriber may otherwise have an interest in the traffic in a geographic region to allow the subscriber to take alternate routes in advance of a problem area. In this manner, it may be unnecessary to store time and date information (preconfigured) in the subscriber database shown in FIG. 13. Instead, a scheduling database maintains lists of subscriber telephones that are to receive text messages when approaching different cell sites and/or geographic regions. In other words, referring to the map as illustrated in FIG. 14, "Joe" may pre-configure the traffic reporting system to receive a traffic report whenever he approaches point "A." Anytime that Joe is approaching the cell site nearest point "A," it is likely that Joe is deciding whether to take the "Cherry Valley" bypass or instead travel along the "Highway." Regardless of the time or day, a short text message can help Joe by telling him if there are any traffic conditions on either road. If traffic is not an issue, Joe may opt to disregard the text message, not activate the traffic service at that use time, or not turn on his wireless device at all. Although the third implementation may result in unnecessary or unneeded messages, it may be simpler to administer, and may help subscribers learn of unpredictable accidents or road construction that may occur when the subscriber did not expect to encounter any traffic.

In a fourth implementation of the short messaging service embodiment, the subscriber's vehicle and/or wireless device can include a GPS receiver for allowing the traffic notification system to track or monitor the locations of the vehicle over a monitoring period. In this example, a traffic reporting system sends traffic information when the subscriber reaches or approaches a certain geographic location, which can be determined using the GPS receiver. As in the third implementation, the traffic reporting system can provide traffic information from the traffic database when the GPS receiver indicates that the driver is in relatively close vicinity to the road, street, or highway affected and/or in question. The reporting system also can be configured to only provide text messages to alert the driver of a traffic advisory in the geographic region in which the driver is presently located or in a direction that is relevant and ahead of the driver (in the direction of travel). For example, the system can be configured to automatically obtain a plurality of geographic location readings about the position of the subscriber's vehicle over a desired time interval and the location, speed and/or direction of travel may be determined dynamically in situ. In this mode, it may be unnecessary for the driver to pre-configure a subscriber database with certain trip information.

Figure 16A:
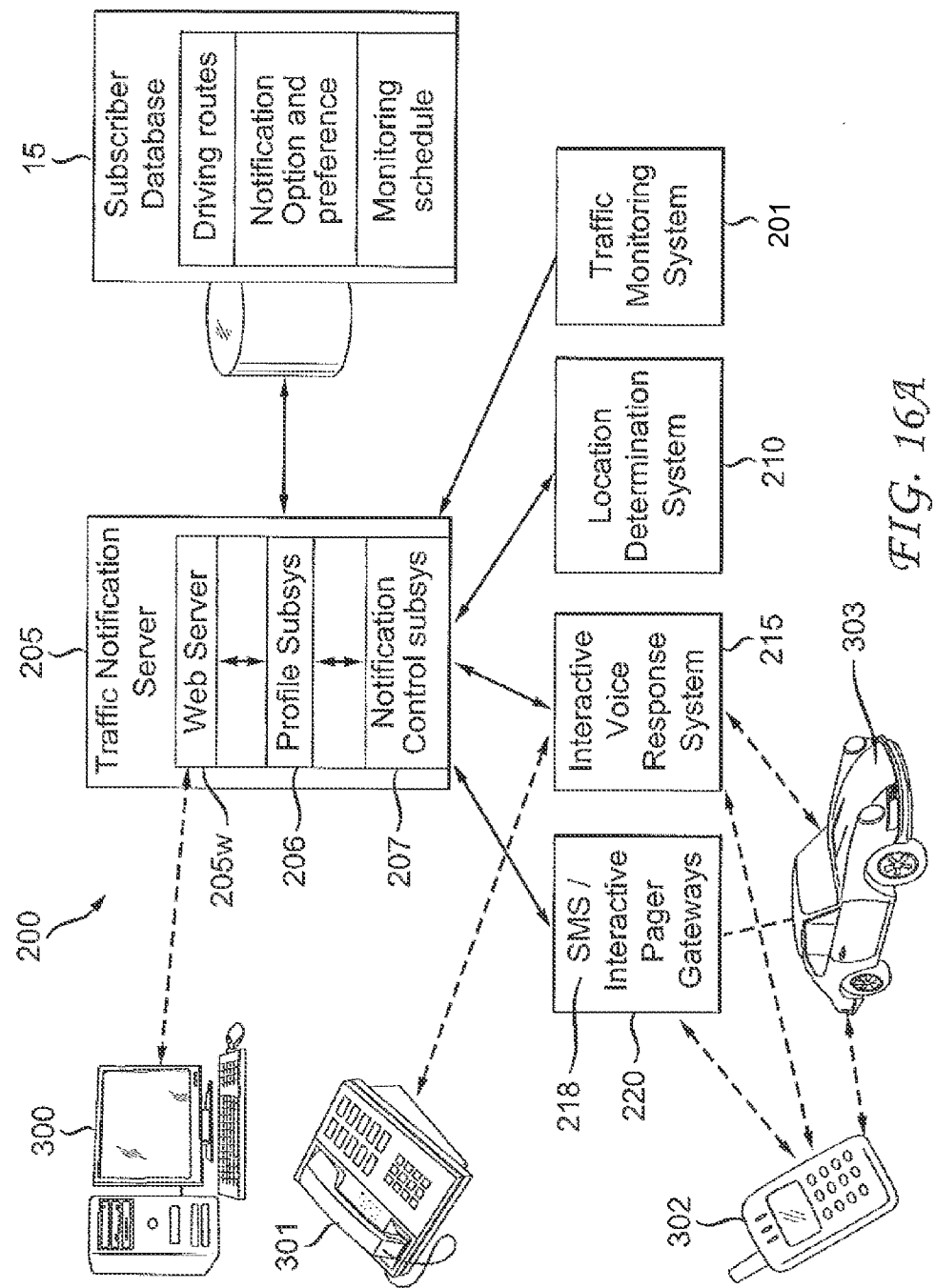
FIG. 16A is a diagram of exemplary components of automated location-intelligent traffic notification systems and methods according to embodiments of the present invention.

FIG. 16A illustrates an exemplary system architecture for providing an automated and location-intelligent traffic notification system ("automated traffic notification system") 200, which can dynamically provide substantially real-time traffic conditions based on in situ determined personalized (custom) individual subscriber location data. As shown, the automated traffic notification system 200 includes at least one traffic notification server 205 which can be a web server 205w forming a general computing platform with network connectivity to other components of the system 200 over an IP (internet protocol) network. The automated traffic notification system 200 can also include a subscriber database 15, a traffic monitoring system 201, (the functionality of which can be provided by the traffic data processors and databases 10 illustrated and described above), a location determination system 210, an interactive voice response system 215 and an SMS and/or interactive pager gateways and the like.

The traffic notification server 205 can be operatively associated with and/or include a profile management subsystem 206 that may be implemented using computer programs that are web based to manage the subscriber data or information in a subscriber database 15. As described above, the subscriber database 15 can include data regarding desired or typical driving routes (frequent and/or trip specific), notification options available for the user and user preference(s), active traffic monitoring schedule(s), and the like. The traffic notification server 205 may also be in communication with and/or include a notification control subsystem 207. The notification control subsystem 207 may be a control application software program that dynamically determines if a notification should be sent to a user/subscriber and how the notification should be sent based on the subscriber's profile as well as substantially real time traffic information that can be transmitted from the traffic monitoring system 201 and the subscriber's geographic location information determined in situ from the location determination system 210.

The traffic monitoring system 201 may be configured to publish/post or otherwise provide traffic information to a server, such as the traffic notification server 205. In certain embodiments, the traffic monitoring system 201 can provide the traffic information in substantially real-time as web pages that may be predefined. Such web pages may also be dynamically generated to incorporate substantially real-time traffic condition data in geographic areas and/or roadways. The web pages may be Hypertext Markup Language (HTML) common gateway interface (CGI) web pages. The web pages may also be or include Java scripts, Java applets or the like which may execute at the web server 205w or other processor. As will be appreciated by those of skill in the art, other mechanisms for communicating between a web server and a client may also be utilized. For example, other markup languages, such as Wireless Markup Language (WML) or the like, for communicating between the traffic notification server 205 and a prospective user using a wireless communication device having an output (such as a display).

As shown in FIG. 16A, the automated traffic notification system 200 can be configured to provide outputs to multiple devices for one or more subscribers (each subscriber can receive the traffic notification in one or several ways concurrently). The output devices are illustrated as a local computer 300 (shown as a web based interface), a conventional telephone 301, and mobile communication devices 302 that may be in a vehicle 303 and/or the vehicle 303 may have an integrated communication system. The automated traffic notification system 200 may employ voice notification to transmit traffic information to a user/subscriber via a voice response system 215 service node controlled by the notification control subsystem 207. The voice response system 215 may be interactive with the user's wireless communication device. As is also shown in FIG. 16A, the short messaging service and/or interactive pager gateway interface 220 can be used to transmit customized traffic information from the traffic notification server 205 to a user/subscriber via the (mobile) wireless communication output devices. In other embodiments, the automated traffic notification system 200 may be configured to directly communicate with the wireless communication devices 302 and/or vehicle 303 integrated communication systems.

Figure 16B:
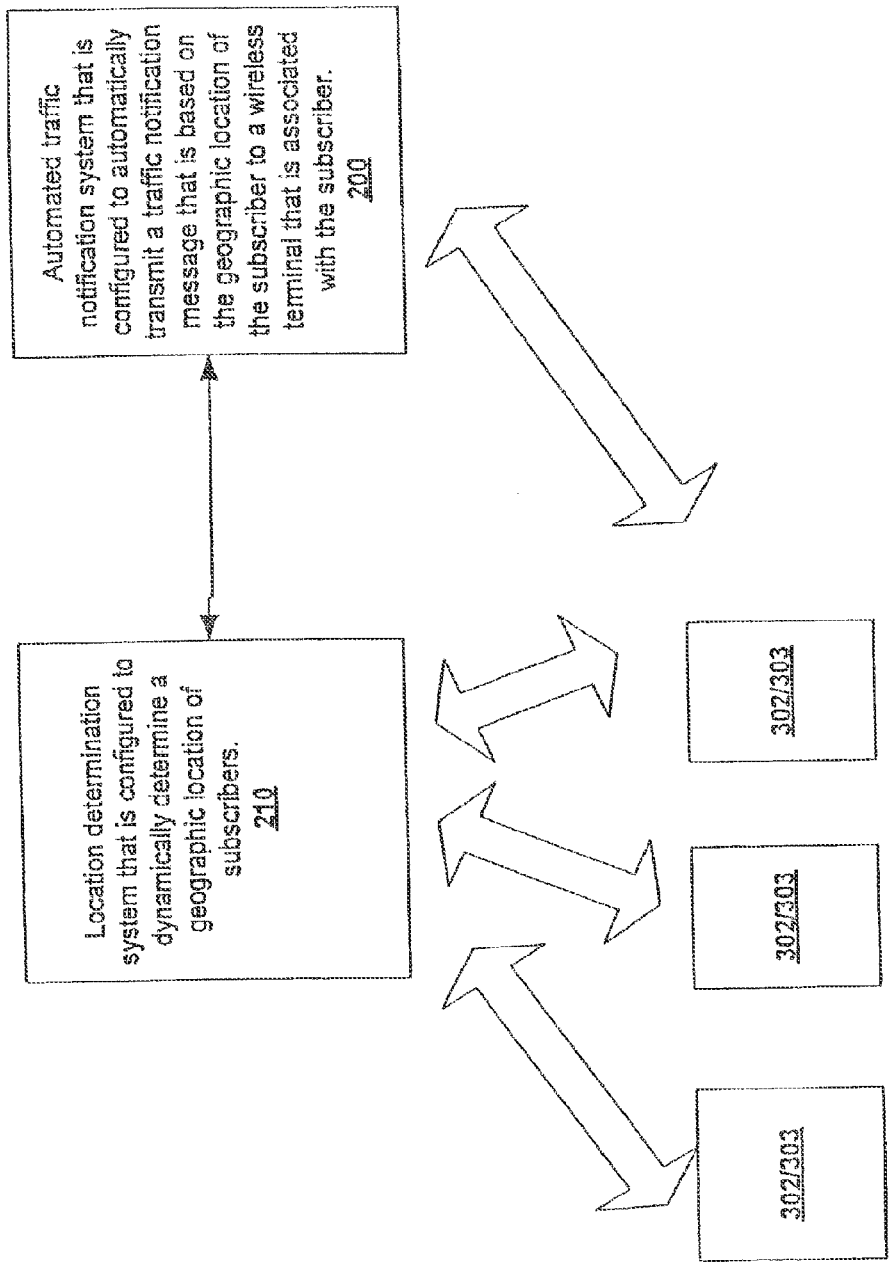
FIG. 16B is a schematic illustration of a location intelligent traffic notification system according to embodiments of the present invention.

FIG. 16B illustrates the automated traffic notification system 200 is in communication with the location determination system 210. The location determination system 210 is configured to determine the location of respective subscribers using the wireless communication device (wireless vehicle integrated device 303 or portable device 302). The traffic notification system 200 is configured to automatically transmit a traffic notification message that is based on the geographic location of the subscriber to a wireless terminal that is associated with the subscriber.

Figure 17A:
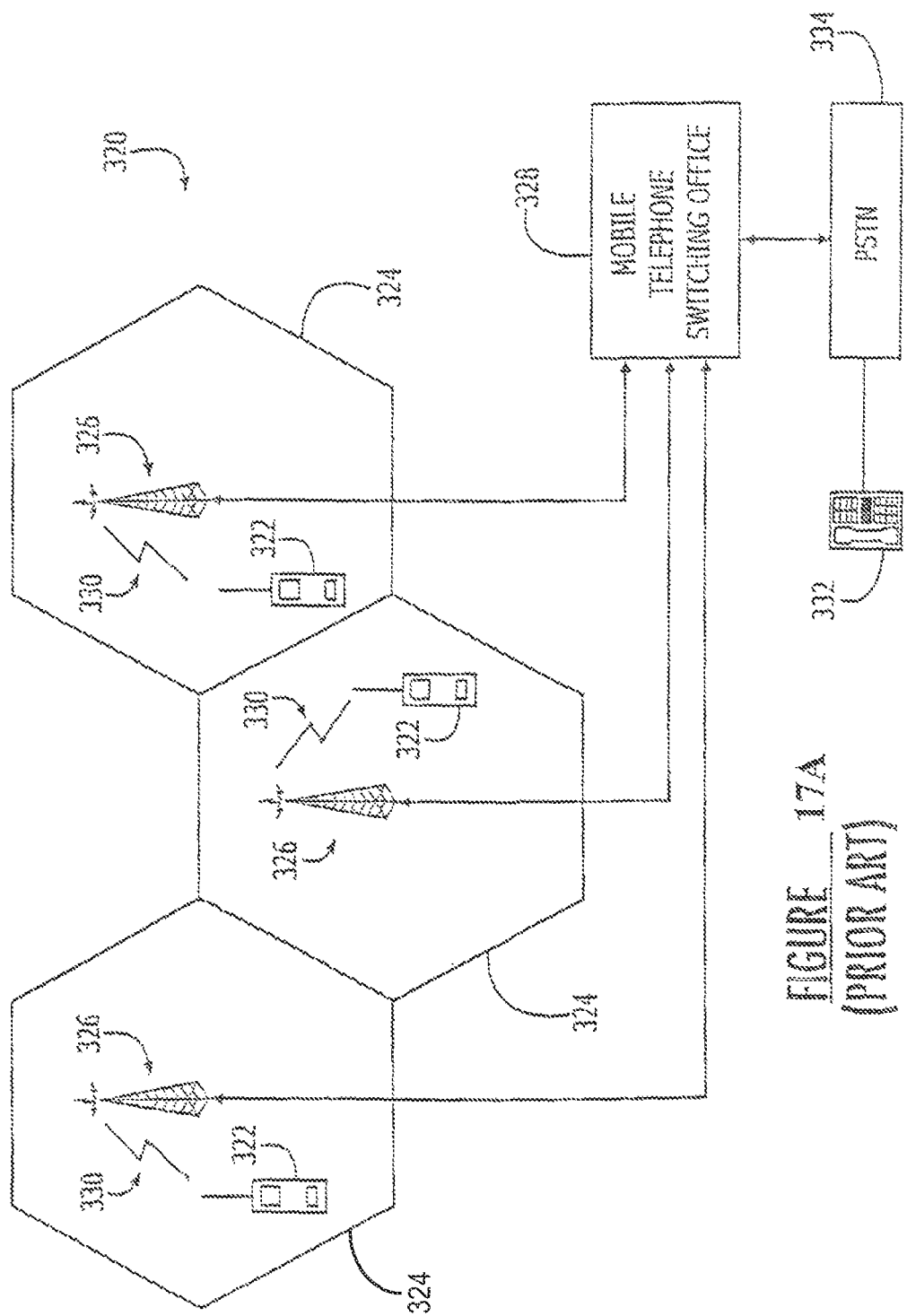
FIG. 17A is a diagram of a prior art terrestrial based communication system.

The location determination system 210 can be a terrestrial or a celestial-based system, or combinations thereof. The location determination system 210 can be configured to determine the geographic location of a subscriber/user (typically carried out in situ, in substantially real-time). FIG. 17A illustrates a conventional terrestrial wireless communication system 320 that may implement conventional wireless communications standards and which may be used to determine location of a user as will be discussed further below. The terrestrial wireless communication system 320 may include one or more wireless mobile terminals (stations) 322 that communicate with a plurality of cells 324 served by base stations 326 and a mobile telephone switching office (MTSO) 328. Although only three cells 324 are shown in FIG. 17A, a typical cellular radiotelephone network may comprise hundreds of cells, and may include more than one MTSO 328 and may serve thousands of wireless mobile terminals 322.

The cells 324 generally serve as nodes in the terrestrial wireless communication system 320, from which links are established between wireless mobile terminals (stations) 322 and a MTSO 328, by way of the base stations 326 servicing the cells 324. Each cell 324 will have allocated to it one or more dedicated control channels and one or more traffic channels. The control channel is a dedicated channel used for transmitting cell identification and paging information. The traffic channels carry the voice and data information. Through the terrestrial wireless communication system 320, a duplex radio communication link 330 may be effectuated between two wireless mobile stations 322 or between a wireless mobile terminal (station) 322 and a landline telephone user 332 via a public switched telephone network (PSTN) 334. The function of the base station 326 is commonly to handle the radio communications between the cell 324 and the wireless mobile terminal 322. In this capacity, the base station 326 functions chiefly as a relay station for data and voice signals.

Figure 17B:
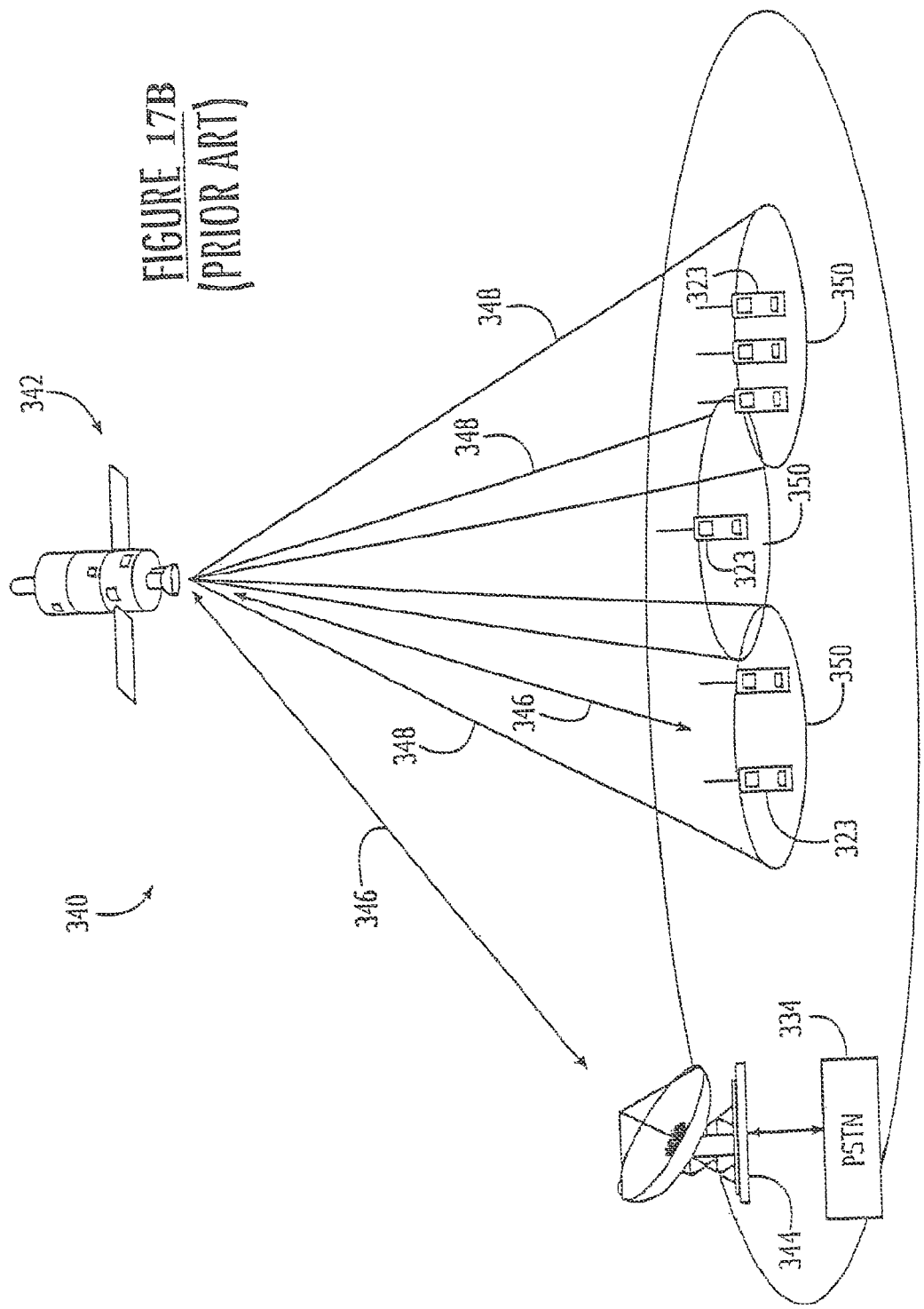
FIG. 17B is a diagram of a prior art celestial based communication system.

As illustrated in FIG. 17B, in a celestial communication and/or geographical location system, a satellite 342 may be employed to perform similar functions to those performed by a conventional terrestrial base station, for example, to serve areas in which population is sparsely distributed or which have rugged topography that tends to make conventional landline telephone or terrestrial cellular telephone infrastructure technically or economically impractical. A satellite radiotelephone system 340 typically includes one or more satellites 342 that serve as relays or transponders between one or more earth stations 344 and terminals 323. The satellite conveys radiotelephone communications over duplex links 346 to terminals 323 and an earth station 344. The earth station 344 may in turn be connected to the PSTN 334, allowing communications between satellite radiotelephones, and communications between satellite radio telephones and conventional terrestrial cellular radiotelephones or landline telephones. The satellite radiotelephone system 340 may utilize a single antenna beam covering the entire area served by the system, or, as shown, the satellite may be designed such that it produces multiple minimally-overlapping beams 348, each serving distinct geographical coverage areas 350 in the system's service region. The coverage areas 350 serve a similar function to the cells 324 of the terrestrial cellular system 320 of FIG. 17A.

Thus, as noted above, such terrestrial or celestial (satellite) communication systems may also be used for location determination. For example, the cell 324 in which the device resides may be determined. Similarly, triangulation between base stations 326 may also be accomplished, for example, based on the relative signal strength and/or signal delays associated with different base stations 326.

For more localized communications wireless networking devices, such as an IEEE 802.11 wireless network adapter may be provided. Such wireless network communications may be carried out as if the monitoring device were connected directly to a network, such as an Internet Protocol (IP) network, Location determination in such a wireless network could also be determined, for example, by determining the wireless access point utilized by the device. Each wireless access point could then be associated with a geographic range of the wireless communications to the wireless access point to determine the location of the monitoring device.

As noted above, embodiments of the present invention may also incorporate a global positioning system (GPS) for use as the position determination device. Briefly described, as illustrated in FIG. 17C, GPS is a space-based triangulation system using satellites 352 and computers 358 to measure positions anywhere on the earth. GPS was developed by the United States Department of Defense as a navigational system. The advantages of this navigational system over other land-based systems are that it is not limited in its coverage, it provides continuous 24-hour coverage, regardless of weather conditions, and is highly accurate. While the GPS technology that provides the greatest level of accuracy may have been retained by the government for military use, a relatively accurate service has been made available for civilian use. In operation, a constellation of 24 satellites 352 orbiting the earth, continually emit a GPS radio signal 354. A GPS receiver 356, e.g., a radio receiver with a GPS processor, receives the radio signals from the closest satellites and measures the time that the radio signal takes to travel from the GPS satellites to the GPS receiver antenna. By multiplying the travel time by the speed of light, the GPS receiver can calculate a range for each satellite in view. Ephemeris information provided in the satellite radio signal typically describes the satellite's orbit and velocity, thereby generally enabling the GPS processor to calculate the position of the GPS receiver 356 through a process of triangulation.

The startup of a GPS receiver typically requires the acquisition of a set of navigational parameters from the navigational data signals of four or more GPS satellites. This process of initializing a GPS receiver may often take several minutes. The duration of the GPS positioning process is directly dependent upon how much information the GPS receiver has initially. Most GPS receivers are programmed with almanac data, which coarsely describes the expected satellite positions for up to one year ahead. However, if the GPS receiver does not have some knowledge of its own approximate location, then the GPS receiver cannot find or acquire signals from the visible satellites quickly enough, and, therefore, cannot calculate its position quickly. Furthermore, it should be noted that a higher signal strength may be needed for capturing the C/A Code and the navigation data at start-up than is needed for continued monitoring of an already-acquired signal. It should also be noted that the process of monitoring the GPS signal may be affected by environmental factors. Thus, a GPS signal, which may be easily acquired in the open typically, becomes harder to acquire when a receiver is under foliage, in a vehicle, or in a building.

As described in U.S. Pat. No. 6,295,023, the disclosure of which is incorporated herein by reference as if set forth fully herein, GPS and cellular communications techniques may be combined to facilitate rapid location determination. Such a combined technique may be beneficial so as to reduce power consumption by reducing the duration that a monitoring system needs to be powered to determine and provide location information, As will be appreciated by those of skill in the art, the GPS receiver may be integrated into the vehicle and/or into the wireless communication device. The particular GPS receiver and/or communication device and/or position determination device utilized may depend on the use of the monitoring device. For example, if the device is utilized in a relatively small-predefined geographic area, then a wireless network may be utilized for both communications and positions. However, if the device is to be used or transported over a large geographic area, then a cellular or satellite communication system may be used in combination with a GPS for position determination. Thus, the present invention should not be construed as limited to a particular communication device and/or positioning system.

The traffic notification server 205 can operate over a computer network such as a local area network, a wide area network or a direct connection and may include an intranet (computers connected within a particular organization, company, coalition, or group), an extranet, a Virtual Private Network (VPN), a global computer network such as the Internet, including the World Wide Web, or other such mechanism for allowing a plurality of data processing systems with respective outputs (displays) to communicate.

The automated traffic notification system 200 includes communication links that allow the traffic notification server 205 to communicate with the desired input and output devices via the computer network. Such communications links may be provided, for example, by a network interface of a data processing system in communication with a processor. Typical network interfaces may include Ethernet, Token Ring or other such direct connections to a computer network provided, typically, by network interface card (NICs) or may be provided by, for example, a modem, including cable modems, Digital Subscriber Loop (DSL) moderns, including ADSL and DSL modems, wireless modems or conventional telephone modems which provide communications to a computer network.

The automated traffic notification system 200 can provide automated notifications to the driver/subscriber based on in situ determinations of the driver's location as the automated traffic notification system 200 can monitor the location of the vehicle and/or subscriber (typically using the wireless device). Thus, the driver does not need to initiate a request for traffic conditions to a service provider to obtain relevant traffic data in a helpful time related manner. Instead, automatic voice and/or text messages (typically a short message service "SMS" and/or alert signals when urgent geographically relevant traffic events are detected) are relayed to a user as the user approaches or is expected to advance onto congested areas or other geographic locations having low drivability ratings such as accidents, poor road conditions and the like.

By way of example and without limitations, a driver can input a desired route using a web browser to communicate with the automated traffic notification system 200 and input subscriber data into the subscriber database 15. The input may include specifying the starting and destination locations and may include an expected schedule or travel period (days, hours, etc.). The input may be provided as a daily (non-weekend) monitoring period during specific hours or as an event specific (one time input for vacation travel and the like). The automated traffic notification system 200 can generate a preferred driving or directional map based on substantially real time traffic information posted by the traffic monitoring system 201. The driver may indicate a notification protocol preference, such as a cell phone number or ipager address, email address, and the like, for receiving traffic notices (in transit). The driver can initiate his/her journey in a vehicle, typically using the preferred route provided by the automated traffic notification system 200. However, the driver may override the preferred route and may notify the automated traffic notification system 200 that he/she will be traveling along an alternate route. In certain embodiments, the automated traffic notification system 200 may be configured to "learn" the driver's typical travel routes and store them in the subscriber database. The subscriber may notify the automated traffic notification system 200 when a route is to be placed into memory and multiple geographic location determinations can be obtained over the commute to automatically "map" the driver's commute or travel route. The "learn" mode may be activated by using predefined function keys or prompts to the system.

Alternately, the automated traffic notification system 200 may determine itself geographically where the subscriber (driver) is and the direction he/she is heading based on a plurality of geographic data determinations obtained dynamically while the subscriber is in transit during a desired monitoring interval. That is, the automated traffic notification system 200 can monitor the location of the subscriber and store the geographic data in the subscriber database. The subscriber's speed and direction of travel can be similarly determined using the geographic data.

In operation, the automated traffic notification system 200 can monitor traffic conditions and notifies and/or posts the information to the traffic notification server 205 in substantially real time or as events are detected. The automated traffic notification system 200 can interrogate the data in the subscriber database 15 and determine which subscribers are likely to be affected by the detected traffic condition. The automated traffic notification system 200 can then confirm that the subscriber is in a geographically relevant position based on the location determination system 210 so as to place the driver at a location in a time and geographically relevant manner. For example, if an event is defined on a particular roadway, and the system determines that the subscriber is already beyond this location, no notification will be sent. In the reverse, if the subscriber is identified as approaching or within a particular distance of a detected driving condition of interest a notification can be transmitted. In certain embodiments, a virtual boundary can be generated by the automated traffic notification system 200 and any incidents occurring within the boundary can be transmitted to the subscriber. The virtual boundary will advance with the movement of the vehicle and the size of the virtual boundary may be dynamically adjustable in transit (typically being longer in the direction of travel along a major roadway and shorter on adjacent sides of the primary travel route) and can depend on the determined speed of the vehicle and the destination, and the like. The automated traffic notification system 200 can be configured to notify the subscriber whenever an adverse traffic event is detected within the virtual boundary.

The traffic notification server 205 then notifies drivers identified by the profile management subsystem 206 and/or location determination system 210 as those that should be notified of the detected condition (typically those identified as being or approaching a geographic region based on the location determination system 210). Thus, the subscriber and/or driver can dynamically automatically receive relevant, customized traffic data on the driver's identified notification device when a traffic incident (accident), construction, congestion, or other low-drivability condition is detected in a relevant geographic region in a time-relevant manner. The automated traffic notification system 200 may also provide an alternative route with the notification or allow a driver/user to request same. The driver/user may also respond to the notice with an acknowledgement to allow the automated traffic notification system 200 to confirm that the user/driver is still in transit and wishes to receive further traffic updates as they occur.

As used herein, the term "wireless communication device" may include, but is not limited to, a cellular wireless terminal with or without a multi-line display; a Personal Communications System (PCS) terminal that may combine a cellular wireless terminal with data processing, facsimile and data communications capabilities; a PDA that can include a wireless terminal, pager, internet/intranet access, web browser, organizer, calendar and/or a GPS receiver; a two-way wireless communicator (such as the Blackberry™ wireless platform); a vehicle integrated cellular and/or satellite based wireless terminal that may include a GPS receiver; and a conventional laptop and/or palmtop receiver or other appliance that includes a wireless terminal transceiver. Wireless communication devices may also be referred to as "pervasive computing" devices and may be mobile terminals. In certain embodiments, the wireless communication device includes an antenna that can be configured to provide resonance for a global positioning system (GPS) and the device can include a GPS receiver. GPS operates at approximately 1,575 MHz.

Figure 18:
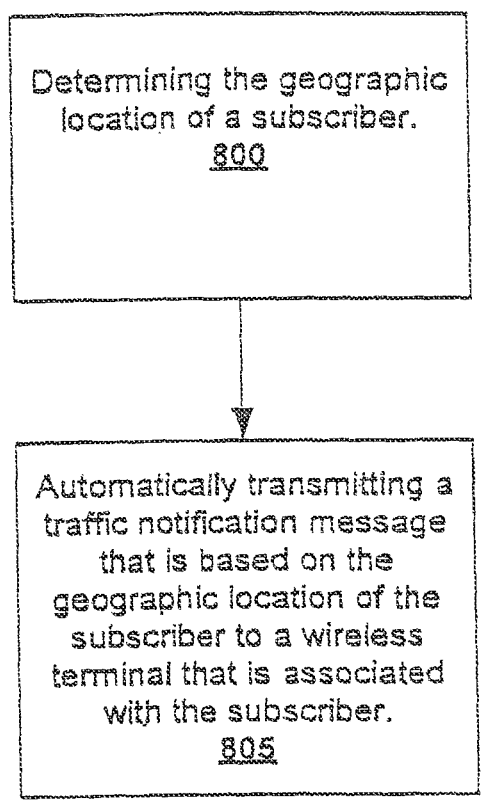

Referring to FIG. 18, embodiments of the present invention include determining the geographic location of a subscriber (block 800); and automatically transmitting a traffic notification message that is based on the geographic location of the subscriber to a wireless terminal that is associated with the subscriber (block 805).

Figure 19:
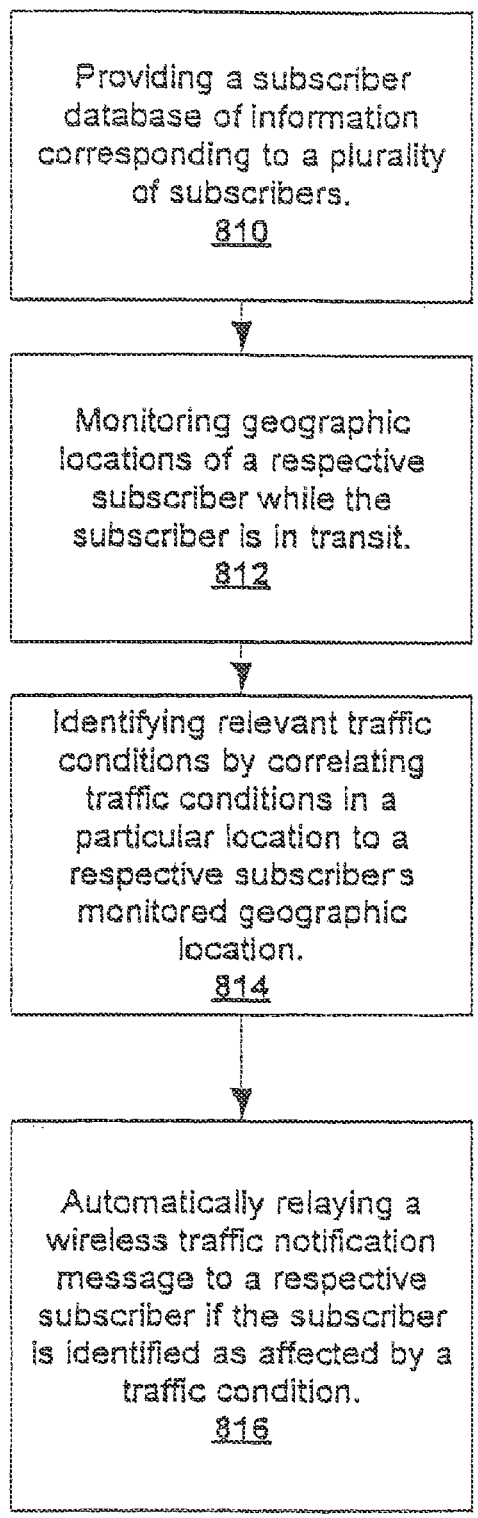

FIG. 19 illustrates exemplary operations that can be used to provide traffic information to a subscriber over a wireless network. The operations include providing a subscriber database of information corresponding to a plurality of subscribers (block 810). The geographic locations of a respective subscriber can be monitored while the subscriber is in transit (block 812). Relevant traffic conditions can be identified by correlating traffic conditions in a particular location to a respective subscriber's monitored geographic location (block 814). A wireless traffic notification message can be automatically relayed to a respective subscriber if the subscriber is identified as affected by a traffic condition (block 816).

Figure 20:
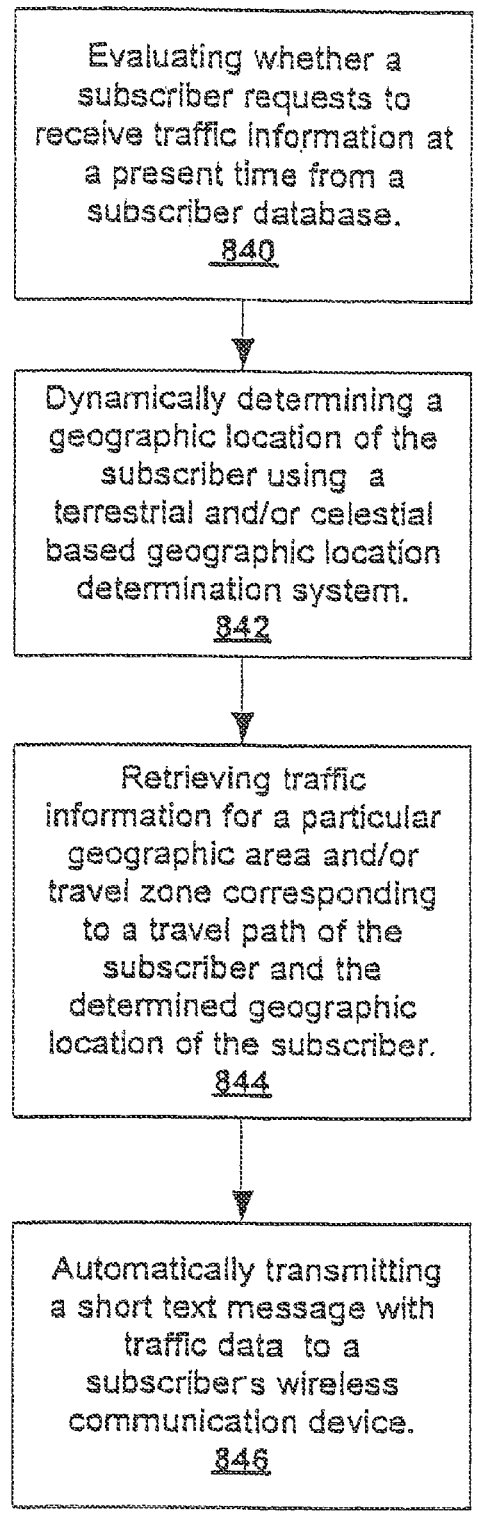

FIG. 20 illustrates additional operations that can be used to provide traffic information over a wireless network using data from a traffic database to a subscriber during a desired monitoring interval or period. The operations include: evaluating whether a subscriber requests to receive traffic information at a present time from a subscriber database (block 840); dynamically determining a geographic location of the subscriber using a terrestrial and/or celestial based geographic location determination system (block 842); retrieving traffic information for a particular geographic area and/or travel zone corresponding to a travel path of the subscriber and the determined geographic location of the subscriber (block 844); and automatically transmitting a short text message to a subscriber's wireless communication device (block 846). The relevant traffic information that is customized to the subscriber's travel path may be reported to the subscriber in a short (such as a text and/or audio) message while the subscriber is in transit.

FIG. 21 illustrates yet other operations that can be used to provide automated location-intelligent traffic notifications. The operations include: providing a subscriber database configured with subscriber specific data from a plurality of subscribers (block 850); determining a geographic location of a subscriber a plurality of times during at least one time period of interest and storing the geographic location data in the subscriber database during a monitoring period (block 852); monitoring the geographic location of the subscriber during the monitoring period based on the geographic location data and the subscriber's direction of travel (block 854); providing substantially current traffic information for routes, streets, roadways and/or travel paths in at least one geographic region (block 856); evaluating when there is a change in a traffic condition a route, street, roadway and/or travel path in the at least one geographic region (block 858); identifying a subscriber that may be affected by the change in the traffic condition using the determined geographic location of the subscriber and data from the subscriber database (block 860); and then automatically transmitting a traffic notification message to the identified subscriber to thereby provide updated relevant traffic information to the subscriber without requiring the subscriber to call, respond to prompts or enter a request to a remote traffic monitoring service for the updated traffic information in transit (block 862).

It is noted that the present invention may be configured to operate using combinations of features of the different embodiments and implementations described above.

The foregoing disclosure of embodiments of the present invention and specific examples illustrating the present invention have been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claimed appended hereto, and by their equivalents.

The statements characterizing the application as a "continuation-in-part" application of a prior application listed under the "Related Applications" section above is used to indicate that additional subject matter has been added to the specification of the priority application but does not necessarily mean that the invention described and claimed in the present application is not supported in full by the prior application.

We claim:

1. A traffic advisory system comprising:
   a processor; and
   a database that stores instructions that, when executed by the processor, cause the processor to perform operations comprising
   determining a direction of travel and a geographic location of a mobile device,
   storing route data identifying a route traveled by the mobile device,
   determining that a traffic condition exists on the route traveled based upon the route data, the geographic location, and the direction of travel of the mobile device,
   in response to determining that the traffic condition exists on the route traveled, transmitting, to the mobile device, a notification for presentation at the mobile device, the notification indicating the traffic condition and a location of the traffic condition, and
   determining a code value indicating drivability for the route traveled.

2. The traffic advisory system of claim 1, wherein the traffic condition comprises a traffic incident.

3. The traffic advisory system of claim 1, wherein the traffic condition comprises traffic congestion.

4. The traffic advisory system of claim 1, wherein the traffic condition comprises a traffic accident.

5. The traffic advisory system of claim 1, wherein the traffic condition comprises road construction.

6. The traffic advisory system of claim 1, wherein the instructions further comprise instructions that, when executed by the processor, cause the processor to perform operations further comprising transmitting the notification using an audio message.

7. The traffic advisory system of claim 1, wherein the instructions further comprise instructions that, when executed by the processor, cause the processor to perform operations further comprising transmitting the notification using a text message.

8. The traffic advisory system of claim 1, wherein the instructions further comprise instructions that, when executed by the processor, cause the processor to perform operations further comprising receiving input from the mobile device, the input corresponding to a request for alternative route information.

9. The traffic advisory system of claim 1, wherein the instructions further comprise instructions that, when executed by the processor, cause the processor to perform operations further comprising receiving input from the mobile device confirming that the mobile device is in transit and that relevant driving-condition updates are to be transmitted to the mobile device.

10. A non-transitory computer readable medium having stored thereon computer-executable instructions that, when executed by a processor, cause the processor to perform operations comprising:
   determining a direction of travel and a geographic location of a mobile device;
   storing route data identifying a route traveled by the mobile device;
   determining that a traffic condition exists on the route traveled based upon the route data, the determined geographic location, and the direction of travel of the mobile device;
   in response to determining that the traffic condition exists on the route traveled; transmitting a notification for presentation at the mobile device, the notification indicating the traffic condition and a location of the traffic condition; and
   determining a code value indicating drivability for the route traveled.

11. The non-transitory computer readable medium of claim 10, wherein the instructions further comprise instructions that, when executed by the processor, cause the processor to perform operations further comprising receiving input from the mobile device, the input corresponding to a request for alternative route information.

12. The non-transitory computer readable medium of claim 10, wherein the instructions further comprise instructions that, when executed by the processor, cause the processor to perform operations further comprising receiving input from the mobile device confirming that the mobile device is in transit and that relevant driving-condition updates are to be transmitted to the mobile device.

13. The non-transitory computer readable medium of claim 10, wherein the instructions further comprise instructions that, when executed by the processor, cause the processor to perform operations further comprising transmitting the notification using an audio message.

14. The non-transitory computer readable medium of claim 10, wherein the instructions further comprise instructions that, when executed by the processor, cause the processor to perform operations further comprising transmitting the notification using a text message.

15. The non-transitory computer readable medium of claim 10, wherein the traffic condition comprises a traffic incident.

16. The non-transitory computer readable medium of claim 10, wherein the traffic condition comprises traffic congestion.

17. A traffic advisory system comprising:
   a processor; and
   a database that stores instructions that, when executed by the processor, cause the processor to perform operations comprising
      determining a direction of travel and a geographic location of a mobile device,
      storing route data identifying a route traveled by the mobile device,
      determining that a traffic condition exists on the route traveled based upon the route data, the geographic location, and the direction of travel of the mobile device,
      in response to determining that the traffic condition exists on the route traveled,
      transmitting, to the mobile device, a notification for presentation at the mobile device in a graphical user interface presenting a map and visual representation of the route, the notification indicating the traffic condition and a location of the traffic condition on the map, and
      determining a code value indicating drivability for the route traveled.

18. The traffic advisory system of claim 17, wherein the instructions further comprise instructions that, when executed by the processor, cause the processor to perform operations further comprising receiving input from the mobile device, the input corresponding to a request for an alternative route.

19. The traffic advisory system of claim 17, wherein the instructions further comprise instructions that, when executed by the processor, cause the processor to perform operations further comprising receiving input from the mobile device indicating that driving-condition updates are to be transmitted to the mobile device.

20. The traffic advisory system of claim 17, wherein the traffic condition comprises traffic congestion, and wherein a location of the traffic congestion is indicated on the map displayed at the mobile device.

* * * * *